United States Patent [19]
Misheski et al.

[11] Patent Number: 5,915,252
[45] Date of Patent: Jun. 22, 1999

[54] OBJECT ORIENTED FRAMEWORK MECHANISM FOR DATA TRANSFER BETWEEN A DATA SOURCE AND A DATA TARGET

[75] Inventors: David Joseph Misheski, Plainview; Clifton Malcolm Nock, Rochester, both of Minn.

[73] Assignee: International Business Machines Corporation, Armonk, N.Y.

[21] Appl. No.: 08/724,570

[22] Filed: Sep. 30, 1996

[51] Int. Cl.$^6$ .................................................. G06F 17/00
[52] U.S. Cl. ............................... 707/103; 707/8; 707/10; 395/683; 395/684; 395/685
[58] Field of Search ....................... 707/1–206, 517–530; 701/201–205; 345/961–970; 395/680–685; 711/170–208

[56] References Cited

U.S. PATENT DOCUMENTS

| | | | |
|---|---|---|---|
| 4,943,932 | 7/1990 | Lark et al. | 364/513 |
| 5,057,996 | 10/1991 | Cutler et al. | 364/200 |
| 5,101,364 | 3/1992 | Davenport et al. | 395/152 |
| 5,119,475 | 6/1992 | Smith et al. | 395/156 |
| 5,181,162 | 1/1993 | Smith et al. | 364/419 |
| 5,195,172 | 3/1993 | Elad et al. | 395/50 |
| 5,226,161 | 7/1993 | Khoyi et al. | 395/650 |
| 5,247,693 | 9/1993 | Bristol | 395/800 |
| 5,249,270 | 9/1993 | Stewart et al. | 395/200 |
| 5,257,384 | 10/1993 | Farrand et al. | 395/725 |
| 5,261,080 | 11/1993 | Khoyi et al. | 395/500 |
| 5,274,572 | 12/1993 | O'Neill et al. | 364/550 |
| 5,276,775 | 1/1994 | Meng | 395/55 |
| 5,287,447 | 2/1994 | Miller et al. | 395/157 |
| 5,293,385 | 3/1994 | Hary | 371/19 |
| 5,293,470 | 3/1994 | Birch et al. | 395/135 |
| 5,297,283 | 3/1994 | Kelly, Jr. et al. | 395/650 |
| 5,315,703 | 5/1994 | Matheny et al. | 395/164 |
| 5,315,709 | 5/1994 | Alston, Jr. et al. | 395/600 |
| 5,367,633 | 11/1994 | Matheny et al. | 395/164 |
| 5,369,766 | 11/1994 | Nakano et al. | 395/700 |
| 5,379,430 | 1/1995 | Nguyen | 395/700 |
| 5,388,264 | 2/1995 | Torbias, II et al. | 395/650 |
| 5,390,310 | 2/1995 | Welland | 395/400 |
| 5,390,325 | 2/1995 | Miller | 395/575 |
| 5,396,626 | 3/1995 | Nguyen | 395/700 |
| 5,398,336 | 3/1995 | Tantry et al. | 395/600 |
| 5,418,949 | 5/1995 | Suzuki | 395/600 |
| 5,581,722 | 12/1996 | Welland | 395/417 |
| 5,642,511 | 6/1997 | Chow et al. | 395/701 |

OTHER PUBLICATIONS

Text of IBM Technical Disclosure Bulletin, vol. 37, DeBinder et al., Feb. 1994, "Results Folder Framework", pp. 431–432.

(List continued on next page.)

*Primary Examiner*—Thomas G. Black
*Assistant Examiner*—David Yink Jung
*Attorney, Agent, or Firm*—Martin & Associated, L.L.C.; Derek P. Martin

[57] ABSTRACT

An object oriented framework mechanism for data transfer between a data source and a data target provides an infrastructure that embodies the steps necessary to perform the data transfer and a mechanism to extend the framework to fit a particular data transfer environment. Certain core functions are provided by the framework, which interact with extensible functions provided by the framework user. The architecture of the framework allows a developer to determine the conditions and parameters that apply to the data transfer while allowing a user to interact with the framework with an interface that is consistent regardless of the specific combination of data source, data target, connection type, or protocol. The extensible functions allow new data transfer environments to be easily implemented using the framework. The framework thus allows a common user interface for transferring data between any data source and any data target, which may be easily customized to include data sources, new data targets, new transfer protocols, etc. The framework greatly simplifies the user's job of transferring data since it provides a common interface, and greatly simplifies the developer's job of providing a user interface for a new combination of hardware and/or software by providing established classes that may be easily extended to implement the desired data transfer environment.

32 Claims, 25 Drawing Sheets

OTHER PUBLICATIONS

Text of IBM Technical Disclosure Bulletin, vol. 36, Coskun, N., Jun. 1993, "Persistent Framework Independent Record/Playback Framework", pp. 261–264.

Text of IBM Technical Disclosure Bulletin, Baker et al., Oct. 1991, "Model View Schema", pp. 321–322.

Text of IBM Technical Disclosure Bulletin, Baker et al., Oct. 1991, "Office Container Class", pp. 309–310.

Text of IBM Technical Disclosure Bulletin, Cavendish et al., Jul. 1991, "Icon Pane Class", pp. 118–119.

Text of IBM Technical Disclosure Bulletin, Baker et al., Jun. 1991, "Distribution List Class", p. 159.

Text of IBM Technical Disclosure Bulletin, Cavendish et al., Jun. 1991, "Object–Oriented Documentation Tool", pp. 50–51.

Text of IBM Technical Disclosure Bulletin, vol. 38, No. 1, Jan. 1995, pp. 411–414, J. Knapman, "Generating Specific Server Programs in Distributed Object–Oriented Customer Information Control System".

Text of IBM Technical Disclosure Bulletin, vol. 37, No. 12, Dec. 1994, pp. 19–20, Al–Karmi et al., "Events Set for Event Tracing in Distributed Object–Oriented Systems".

Text of IBM Technical Disclosure Bulletin, vol. 37, No. 12, Dec. 1994, pp. 375–378, Acker et al., "Automatically Generating Formatted Documentation for Object–Oriented Class Libraries".

Text of IBM Technical Disclosure Bulletin, vol. 37, No. 11, Nov. 1994, pp. 71–72, Behrs et al., "Device Support Framework to Support ISO DPA 10175 and POSIX 1387.4".

Text of IBM Technical Disclosure Bulletin, vol. 37, No. 7, Jul. 1994, pp. 145–146, Banda et al., "Exception Management Algorithm for Multi–Threaded Method Invocation".

Text of IBM Technical Disclosure Bulletin, vol. 37, No. 6B, Jun. 1994, pp. 553–556, Gest et al., "Portable Object–Oriented Event Manager".

Abstract for WIPO Patent Application No. WO 95/04966, F. T. Nguyen, Feb. 16, 1995, "Automatic Management of Components in Object–Oriented System".

Abstract for U.S. Patent No. 5,388,264, Milne et al., Feb. 7, 1995, "Object–Oriented Framework System for Enabling Multimedia Presentation with Routing and Editing of MIDI Information".

Abstract for WIPO Patent Application No. WO 94/23364, Heninger et al., Oct. 13, 1994, "Framework Processing Apparatus for Application Software".

Abstract for U.S. Patent No. 5,369,766, Heninger et al., Nov. 29, 1994, "Object Oriented Application Processing Apparatus".

Abstract from WIPO Patent Application No. WO 9422081, Sep. 29, 1994, "Hardware–Independent Interface for Interrupt Processing", G. O. Norman et al.

Abstract for WIPO Patent Application No. 94/19752, Anderson et al., Sep. 1, 1994, "Concurrent Framework Processing Apparatus for Two or More Users".

Abstract for WIPO Patent Application No. 94/19751, Anderson et al., Sep. 1, 1994, "Concurrent Framework Processing Apparatus for Application Users".

Abstract for WIPO Patent Application No. 94/19740, Goldsmith et al., Sep. 1, 1994, "Framework Processor of Object–Oriented Application".

Abstract from WIPO Patent Application No. WO 94/15286, Goldsmith et al., Jul. 7, 1994, "Object–Oriented Framework for Object Operating System".

Abstract for WIPO Patent Application No. 94/15282, Anderson et al., Jul. 7, 1994, "Dialog System Object–Oriented System Software Platform".

Abstract for WIPO Patent Application No. 94/15281, Anderson et al., Jul. 7, 1994, "Atomic Command Object–Oriented System Software Platform".

Abstract from WIPO Patent Application No. WO 9415285, Jul. 7, 1994, "Object–Oriented Notification Framework System", D. R. Anderson et al.

Abstract for U.S. Patent No. 5,119,475, Schoen et al., Jun. 2, 1992, "Object–Oriented Framework for Menu Definition".

Abstract for WIPO Patent Application No. 95/01610, Koko et al., Jan 12, 1995, "Object Oriented Product Structure Management in Computer–Aided Product Design".

Abstract fpr WIPO Patent Application No. 95/04967, Feb. 16, 1995, "Access Method to Data Held in Primary Memory Based Data Base".

Abstract for WIPO Patent Application No. 95/02219, Helgeson et al., Jan. 19, 1995, "Distributed Computation Based on Movement, Execution and Insertion of Processes in Network".

Abstract from U.S. Patent No. 5,371,891, "Object Constructions in Compiler in Object Oriented Programming Language", J. Gray et al., Dec. 6, 1994.

Abstract from EPO Patent Application No. EP 622730, "Encapsulation of Extracted Portions of Documents Into Objects", M. A. Malamud, Nov. 2, 1994.

Abstract for EPO Patent No. 619544, S. Danforth, Oct. 12, 1994, "Language–Neutral Object–Oriented Programming".

Abstract for WIPO Patent No. 94/20912, Sep. 15, 1994, "Object–Oriented System for Managing Financial Instruments".

Inspec Abstract No. C9504–7460–043, Sells et al., 1995, "Implementation of the Architecture for a Time–Domain Dynamical System Simulation in a Very High–Level Pictorial Object–Oriented".

Inspec Abstract No. C9504–7460–042, Coleman et al., 1995, "An End–to–End Simulation of A Surveillance System Employing Architecture Independence, Variable Fidelity Components and Software Reuse".

Inspec Abstract No. C9503–6140D–045, Satoh et al., 1995, "Process Algebra Semantics for a Real Time Object Oriented Progamming Language".

Inspec Abstract No. C9501–7160–020, C. Le Pape, 1993, "The Cost of Genericity: Experiments With Constraint––Based Representations of Time–Tables".

Inspec Abstract No. C9501–6140D–005, S. Vinoski, 1994, "Mapping CORBA IDL Into C++".

Inspec Abstract No. C9501–7330–007, Salminen et al., 1994, "Modelling Trees Using an Object–Oriented Scheme".

Inspec Abstract No. C9412–6110B–211, Berghel et al., 1992, "A Generic Object–Oriented Concurrency Mechanism for Extensibility and Reuse of Synchronization Components".

Inspec Abstract No. B9412–6210Q–016, from Oingzhong et al., 1992, "An Object–Oriented Model for Ingelligent Networks".

Inspec Abstract No. C9412–7810–003, from Jung et al., 1993, "Development of an Object–Oriented Anthropometric Database for an Ergonomic Man Model".

Inspec Abstract No. C9412–6110J–014 from Griss et al., 1994, "Object–Oriented Reuse".

Inspec Abstract No. C9411–6130B–108, from Mili et al., 1992, "Building a Graphical Interface for a Reuse–Oriented CASE Tool".

Inspec Abstract No. C9411–7100–029, from C. Le Pape, 1994, "Implementation of Resource Constraints in ILOG Schedule: A Library for the Development of Constraint–Based Scheduling Systems".

Inspec Abstract No. C9411–6115–035, from Mili et al., 1991, "SoftClass: An Object–Oriented Tool for Software–Reuse".

Inspec Abstract No. C9410–6180G–015, from Eichelberg et al., 1993, "Integrating Interactive 3D–Graphics into an Object–Oriented Application Framework".

Inspec Abstract No. B9409–6210M–025, from Hellemans et al., 1994, "An Object–Oriented Approach to Dynamic Service Descriptions".

Inspec Abstract No. C9409–6180–059, from Wang et al., 1993, "A Framework for User Customization".

Inspec Abstract No. C9408–6110B–016, from Chen et al., 1994, "An Experimental Study of Using Reusable Software Design Frameworks to Achieve Software Reuse".

Inspec Abstract No. C9408–7420–021, from Pirklbauer et al., 1994, "Object–Oriented Process Control Software".

Inspec Abstract No. C9408–6110J–011, from Gyu–Chung et al., 1993, "System Methodologies of Object–Oriented Programs".

Inspec Abstract No. C9407–7420D–045, from Desai et al., "Controller Structure Definition Via Intelligent Process Control", 1994.

Inspec Abstract No. C9407–6140D–014, from Satoh et al., 1994, Semantics for a Real–Time Object–Oriented Programming Language.

Inspec Abstract No. C9406–6150N–015, from Schmidt et al., 1994, "The Service Configurator Framework: An Extensible Architecture for Dynamically Configuring Concurrent, Multi–Service Network Daemons".

Inspec Abstract No. C9405–6180G–031, from Woyak et al., 1993, "A Motif–Like Object–Oriented Interface Framework Using PHIGS".

Inspec Abstract No. C9504–6130B–049, from A. van Dam, 1995, "VR as a Forcing Function: Software Implications of a New Paradigm".

Inspec Abstract No. C9504–6140D–024, from Sheffler et al., 1995, "An Object–Oriented Approach to Nested Data Parallelism".

Inspec Abstract No. C9503–6110B–045, from Rosiene et al., 1995, "A Data Modeling Framework for Queueing Network Models".

Inspec Abstract No. B9503–8110B–023, from Mautref et al., 1995, "An Object–Oriented Framework for the Development of Interactive Decision Support Systems".

Inspec Abstract No. C9502–7160–026, from Menga et al., 1995, "An Object–Oriented Framework for Enterprise Modelling".

Inspec Abstract No. C9502–6130G–006, "Support for Enterprise Modelling in CSCW", P. Hennessy et al., 1994.

Inspec Abstract No. C9502–7810C–058, from Lin et al., 1995, "Can CAL Software Be More Like Computer Games?".

Inspec Abstract No. C9501–6115–039, from Elia et al., 1993, "G++: An Object Oriented Environment for Developing Distributed Applications".

Inspec Abstract No. C9412–7330–186, from Righter et al., 1994, "An Object–Oriented Characterization of Spatial Ecosystem Information".

Inspec Abstract No. C9412–6160J–025 from J. Livari, 1994, "Object–Oriented Information Systems Analysis: A Comparison of Six Object–Oriented Analysis Methods".

Inspec Abstract No. C9412–6110J–006, from Lau et al., 1993, "Using SOM for Tool Integration".

Inspec Abstract No. C9411–6160J–011, from Odberg et al., 1992, "A Framework for Managing Schema Versioning in Object–Oriented Databases".

Inspec Abstract No. C9406–6110J–007, from J. D. Grimes, 1993, "Objects 101—An Implementation View", Proceedings of COMPCON 1994.

Inspec Abstract No. 4647921, from Uhorchak et al., 1993, "An Object–Oriented Class Library for Creating Engineering Graphs Using PHIGS".

Inspec Abstract No. 4642214, from Marshall et al., 1992, "Using VDM Within an Object–Oriented Framework".

Inspec Abstract No. 4626386, from Arora et al., 1993, "Building Diverse Environments with PCTE Workbench".

Inspec Abstract No. 4622794, from Campbell et al., 1993, "A Technique for Documenting the Framework of an Object–Oriented System".

Inspec Abstract No. 4618974, from Bowers, 1993, "Some Principles for the Encapsulation of the Bahaviour of Aggregate Objects".

Inspec Abstract No. 461931, from Islan et al, 1993, "Uniform Co–Scheduling Using Object–Oriented Design Techniques".

Inspec Abstract No. 4613481, from Thieme et al., 1993, "Schema Integration in Object–Oriented Databases".

Inspec Abstract No. 4603430, from G. Booch, 1994, "Designing an Application Framework".

Inspec Abstract No. 4596323, from Frank et al., 1993, "An Integrated Environment for Designing Object–Oriented Enterprise Models".

Inspec Abstract No. 4593721, Periyasamy et al., 1993, "A Formal Framework for Design and Verification of Robotic Agents".

Inspec Abstract No. 4588839, from L. Fisher, 1992, "Constructing a Class Library for Microsoft Windows".

Inspec Abstract No. 4588834, from G. Olander, 1992, "Chembench: Redesign of a Large Commercial Application Using Object–Oriented Techniques".

Inspec Abstract No. 4566447, from J. Rossazza, 1992, "An Object–Centered Fuzzy Representation".

Inspec Abstract No. 4565630, from Karpovich et al, 1993, "A Parallel Object–Oriented Framework for Stencil Algorithms".

Inspec Abstract No. C9402–6150G–002, from Bruegge et al., 1993, "A Framework for Dynamic Program Analyzers".

Inspec Abstract No. 4550414, from Parrish et al., 1993, "Automated Flow Graph–Based Testing of Object–Oriented Software Modules".

Inspec Abstract No. 4540729, from Bailes et al., "The Ecology of Class Refinement", 1991.

Inspec Abstract No. 4534334, from Campbell et al., 1991, "A Technique for Documenting the Framework of an Object–Oriented System".

Inspec Abstract No. 4534330, from Istavrinos et al., 1992, "Experiences with an Object–Oriented Mapper for Coherent Distributed Shared Memory".

Inspec Abstract No. 4528985, from Beneventano et al., 1993 "Taxonomic Reasoning with Cycles in Logidata+".

Inspec Abstract No. 4525743, from Hakimzadeh et al., 1993, "Instance Variable Access Locking for Object–Oriented Databases".

Inspec Abstract No. 4512593, from H. Sakai, 1993, "A Method for Contract Design and Delegation in Object Behavior Modeling".

Inspec Abstract No. B9310–6210L–099, "Templates, Types and Classes in Open Distributed Processing", 1993.

Inspec Abstract No. 4459325, from Kesim et al., 1992, "On the Evolution of Objects in a Logic Programming Framework".

Inspec Abstract No. 4447153, from Klein et al., 1992, "An Object–Oriented Framework for Curves and Surfaces".

Inspec Abstract No. 4426852, from Benveniste et al., 1992, "Concurrent Programming Notations in the Object–Oriented Language Arche".

Inspec Abstract No. 4425343, from Demurjian et al., 1993, "Programming Versus Databases in Object–Oriented Paradigm".

Inspec Abstract No. 4417604, from Kraiem et al., 1992, "Mapping of Conceptual Specifications Into Object–Oriented Programs".

Inspec Abstract No. 4417563, from E. Maim, 1992, "Recognizing Objects from Constraints".

Inspec Abstract No. 4411998, from Yi Deng et al., 1992, "Unifying Multi–Paradigms in Software System Design".

Inspec Abstract No. 4408394, from Allen et al., 1992, "GEM: Global Event Management in CAD Frameworks".

Inspec Abstract No. 4400350, from Y. Shoham, 1993, "Agent–Oriented Programming".

Inspec Abstract No. 4395549, from Hogstrom et al., 1992, "Portability and Data Structures in Scientific Computing–Object–Oriented Design of Utility Routines in Fortran".

Inspec Abstract No. 4391388, from Thomas et al., 1992, "A Generic Object–Oriented Concurrency Mechanism for Extensibility and Reuse of Synchronization Components".

Inspec Abstract No. 4387201, from Chu et al., 1992, "A Pattern Based Approach of Integrating Data and Knowledge to Support Cooperative Query Answering".

Inspec Abstract No. 4366189, from Holt et al., 1992, "A Framework for Using Formal Methods in Object–Oriented Software Development".

Inspec Abstract No. 4356300, from Bertino et al., 1993, "Path–Index: An Approach to the Efficient Execution of Object–Oriented Queries".

Inspec Abstract No. 4341376, from Bertino et al., 1992, "Optimization of Object–Oriented Queries Using Path Indices".

Inspec Abstract No. 4331060, from Lau et al., 1992, "An Object–Oriented Class Library for Scalable Parallel Heuristic Search".

Inspec Abstract No. 4318465, from P. Madany, 1992, "Object–Oriented Framework for File Systems".

Inspec Abstract No. 4302722, from Eggenschwiler et al., 1992, "ET++SwapsManager: Using Object Technology in the Financial Engineering Domain".

Inspec Abstract No. 4298324, from S. Nichol, 1992, "Extending Turbo Vision".

Inspec Abstract No. 4297404, from Tanaka et al., 1992, "Two–Level Schemata and Generalized Links for Hypertext Database Models".

Inspec Abstract No. 4287814, from Natarajan et al., 1992, "Issues in Building Dynamic Real–Time Systems".

Inspec Abstract No. 4281362, from Marshall et al., 1991, "Using VDM within an Object–Oriented Framework".

Inspec Abstract No. 4275707, from Tsukamoto et al., 1991, "DOT: A Term Representation Using DOT Algebra for Knowledge–Bases".

Inspec Abstract No. 4275698, from Van den Bussche et al., 1991, "Evaluation and Optimization of Complex Object Selections".

Inspec Abstract No. 4275693, from Giannotti et al., 1991, "Non–Determinism in Deductive Databases".

Inspec Abstract No. 4270361, from Artale et al., 1991, "Introducing Knowledge Representation Techniques in Database Models".

Inspec Abstract No. 4270125, from Becker et al., 1991, "Reusable Object–Oriented Specifications for Decision Support Systems".

Inspec Abstract No. 4258492, from M. Ball, 1992, "Inside Templates: Implementing C++ Strategies".

Inspec Abstract No. 4258051, from Rundensteiner et al., 1992, "Set Operations in Object–Based Data Models".

Inspec Abstract No. 4244023, from George et al., 1991, "An Object–Oriented Data Model to Represent Uncertainty in Coupled Artificial Intelligence–Database Systems".

Inspec Abstract No. 4324438, from Madany et al., 1991, "Organizing and Typing Persistent Objects Within an Object–Oriented Framework".

Inspec Abastract No. 4152687, from M. Wolczko, 1992, "Encapsulation, Delegation and Inheritance in Object–Oriented Languages".

Inspec Abstract No. 4117514, from Wuwongse et al., 1991, "An Object–Oriented Approach to Model Management".

Inspec Abstract No. C94204–6110J–017, "Choices, Frameworks and Refinement", R. H. Campbell et al., 1991.

Inspec Abstract No. 4090970, from P. Kougiouris, 1991, "Device Management Framework for an Object–Oriented Operating System".

Inspec Abstract No. 4077440, from A. Mahler, 1991, "Organizing Tools in a Uniform Environment Framework".

Inspec Abstract No. 4067033, from Shaw et al., 1990, "Experience with the ET++ Application Framework".

Inspec Abstract No. 4060084, from Muller et al., 1990, "ODICE: Object–Oriented Hardware Description in CAD Environment".

Inspec Abstract No. 4050569, from Di Giovanni et al., 1990, "HOOD Nets".

Inspec Abstract No. C91072815, from Holtkamp et al, 1990, "DEMOM–A Description Based Media Object Data Model".

Inspec Abstract No. C91072016, from A. Lane, 1991, "/DOS/C++—Application Frameworks".

Inspec Abstract No. C91072574, from Hemery et al., "An Analysis of Communication and Multiprogramming in the Helios Operating System", Sep. 1991.

Inspec Abstract No. C91064787, from Madany et al, 1989, "A Class Hierarchy for Building Stream–Oriented File Systems".

Inspec Abstract No. C91064580, from Gamma et al., 1989, "Integration of a Programming Environment into ET++—A Case Study".

Inspec Abstract No. C91058815, from Menga et al., 1990, "G++: An Environment for Object Oriented Analysis and Prototyping".

Inspec Abstract No. B91052096, from Cusack et al., 1990, "Object–Oriented Specification in LOTOS and Z, or My Cat Really is Object–Oriented!".

Inspec Abstract No. C91053475, from Queinnec et al., 1988, "An Open Ended Data Representation Model for EU–LISP".

Inspec Abstract No. C91053151, from E. Cusack, 1991, "Refinement, Conformance and Inheritance".

Inspec Abstract No. C91042802, from T. Yokoyama, 1990, "An Object–Oriented and Constraint–Based Knowledge Representation System for Design Object Modeling".

Inspec Abstract No. C91041980, from Choi et al., 1991, "Graph Interpretation of Methods: A Unifying Framework for Polymorphism in Object–Oriented Programming".

Inspec Abstract No. C91042655, from Q. Li, 1991, "Extending Semantic Object Model: Towards More Unified View of Information Objects".

Inspec Abstract No. C91024852, from Pierra et al., 1990, "An Object Oriented Approach to Ensure Portability of CAD Standard Parts Libraries".

Inspec Abstract No. C91010951, from T. Helton, 1990, "Level5 Object".

Inspec Abstract No. B90075006, from Gossain et al., 1989, "Designing a Class Hierarchy for Domain Representation and Reusability".

Inspec Abstract No. C91003997, from J. Muys–Vasovic, 1989, "MacApp: An Object–Oriented Application Framework".

Inspec Abstract No. C91004708, from Bertino et al., 1990, "Optimization of Queries Using Nested Indices".

Inspec Abstract No. C90052277, from I. Tervonen, 1990, "Object–Oriented Development as a Multiview Software Construction Methodology".

Inspec Abstract No. C90052627, from Schrefl et al., 1988, "A Knowledge–Based Approach to Overcome Structural Differences in Object Oriented Database Integration".

Inspec Abstract No. C90047457, from Yokoyama et al., 1990, "A Constraint–Based and Object–Oriented Knowledge Representation".

Inspec Abstract No. C90034818, from Q. Chen, 1988, "Extending the Object–Oriented Paradigm for Supporting Complex Objects".

Inspec Abstract No. C90030609, from Forde et al., 1990, "Object–Oriented Finite Element Analysis".

Inspec Abstract No. C90007733, from Weinand et al., 1989, "Design and Implementation of ET++, A Seamless Object–Oriented Application Framework".

Inspec Abstract No. C89062837, from Pasquier–Boltuck et al., 1988, "Prototyping an Interactive Electronic Book System Using an Object–Oriented Approach".

Inspec Abstract No. C89056727, from Campbell et al., 1989, "Principles of Object–Oriented Operating System Design".

Inspec Abstract No. C89056859, from Hull et al, 1989, "On Accessing Object–Oriented Databases: Expressive Power, Complexity, and Restrictions".

Inspec Abstract No. C89049257, from Madany et al., 1989, "Class Hierarchy for Building Stream–Oriented File Systems".

Inspec Abstract No. C89039001, from Brophy et al., 1989, "A Framework for Multiple, Concurrent Graphical Representation".

Inspec Abstract No. C89033226, from Corradi et al., 1988, "PO: An Object Model to Epxress Parallelism".

Inspec Abstract No. C89014870, from R. King, 1988, "Semantic and Object–Oriented Database Support for Software Environments".

Inspec Abstract No. 89003142, from Tenma et al., 1986, "A System for Generating Language–Oriented Editors".

Inspec Abstract No. C88013915, from Woelk et al., 1987 "Multimedia Information Management in an Object–Oriented Database System".

Inspec Abstract No. C88007447, from P. Allen, 1987, "A Framework for Implementing Multisensor Robotic Tasks".

Inspec Abstract No. C87007043, from Whitted et al., 1986, "Exploiting Classes in Modeling and Display Software".

Inspec Abstract No. C86039588, from K. Fukunaga., 1985; "Prompter: A Knowledge Based Support Tool for Code Understanding".

Inspec Abstract No. C86024804, from Greenspan et al., 1986, "A Requirements Modeling Language and Its Logic".

Inspec Abstract No. C84005713, from Meyer et al., 1983, "Towards a Two–Dimensional Programming Environment".

Inspec Abstract No. C81005505, from Mylopoulos et al., 1980, "Some Features of the TAXIS Data Model".

OBJECT ORIENTED FRAMEWORK MECHANISM FOR DATA TRANSFER BETWEEN A DATA SOURCE AND A DATA TARGET

FIELD OF THE INVENTION

The present invention relates in general to the data processing field. More specifically, the present invention relates to the field of Object Oriented framework mechanisms.

BACKGROUND OF THE INVENTION

The development of the EDVAC computer system of 1948 is often cited as the beginning of the computer era. Since that time, computer systems have evolved into extremely sophisticated devices, and have widespread usage in many different applications. Computers perform their functions by transferring and manipulating data at high speed. Thus, data transfer is a fundamental function accomplished in every computer. In a computer system there may be many places where data may reside. If data is to be read from a first device and written to a second device, the first device is referred to herein as the data source, and the second device is referred to herein as the data target. For example, in a data transfer from Random Access Memory (RAM) to a hard disk drive, the RAM is the data source and the hard disk drive is the data target. Similarly, in a data transfer between a hard disk drive and a tape drive unit, the hard disk drive is the data source and the tape drive unit is the data target. The term data source as used herein includes any and all devices that are a part of a computer system or that may be coupled to a computer system by any means from which data may be read. In a similar manner, the term data target as used herein includes any and all devices that are a part of a computer system of that may be coupled to a computer system by any means to which data may be written.

Recent years have seen rapid growth in network computing, especially on the Internet. Network computing gives rise to more complex data transmission problems, since a user that needs to transfer data to another user on the network may not know the specific platform or protocol the other user is using or expects to see. Some network protocols such as Transmission Control Protocol/Internet Protocol (TCP/IP) and File Transfer Protocol (FTP) provide ways for different types of computers to interact and transfer data. However, known methods for transferring data within a computer system or across a connection between computer systems have significant limitations. For example, while FTP provides a uniform protocol for sending and receiving data, a software application that can transmit in FTP must be running on the data source and a software application that can receive and understand FTP must be running on the data target for the transfer to occur. Each FTP software application must be tailored to the specific computer system (i.e., platform) that it runs on, and must have a knowledge of system-specific parameters. When a new device is developed that needs to be included as either a data source or a data target (or both), a new application must be developed that will allow the new device to communicate with other devices.

Various software tools have been used to automate data transfers. However, prior art software tools are written to implement a specific data transfer protocol on a specific platform. Although these tools perform similar functions, their user interfaces are completely different. The problem of special and incompatible tools becomes readily apparent in the context of a software build, where a computer system must interact with many different data sources and targets to be configured with the correct software before the computer system is shipped to a customer. A computer system may need to access data on numerous different devices using numerous different connection types and numerous different protocols. Each different combination of device/connection type/protocol will generally have a different software tool. Thus, an agent (whether machine or human) that manages the software build process must have intimate knowledge relating to the details of each needed data transfer, and must make the data transfer perform correctly. When a new type of transfer is needed, then either a new tool must be developed or an existing tool must be updated to accommodate the new transfer. As updates to tools accumulate, tools become very difficult to maintain and debug and they lose all commonality, evolving into completely unique tools that perform only their intended purpose.

With the proliferation of networks and, in particular, the Internet, the need for better mechanisms for transferring data within a computer system and across different computer systems becomes more apparent and more acute. Without a mechanism that can be readily customized and extended to accommodate new data sources, new data targets, and new protocols in a computer system, the rate of developing computer software to accommodate new data transfer environments will be impaired.

SUMMARY OF THE INVENTION

According to the present invention, an object oriented framework mechanism for data transfer between a data source and a data target provides an infrastructure that embodies the steps necessary to perform the data transfer and a mechanism to extend the framework to fit a particular data transfer environment. Certain core functions are provided by the framework, which interact with extensible functions provided by the framework user. The architecture of the framework allows a developer to determine the conditions and parameters that apply to the data transfer while allowing a user to interact with the framework with an interface that is consistent regardless of the specific combination of data source, data target, connection type, or protocol. The extensible functions allow new data transfer environments to be easily implemented using the framework. The framework thus allows a common user interface for transferring data between any data source and any data target, which may be easily customized to include data sources, new data targets, new transfer protocols, etc. The framework greatly simplifies the user's job of transferring data since it provides a common interface, and greatly simplifies the developer's job of providing a user interface for a new combination of hardware and/or software by providing established classes that may be easily extended to implement the desired data transfer environment.

The framework mechanism of the present invention was designed and constructed using object-oriented technology. Those who are unfamiliar with object-oriented technology, or with object-oriented framework mechanisms, should read the object-oriented overview section of the Description of the Preferred Embodiments.

DESCRIPTION OF THE PREFERRED EMBODIMENTS

Overview—Object-Oriented Technology

Figure 1:
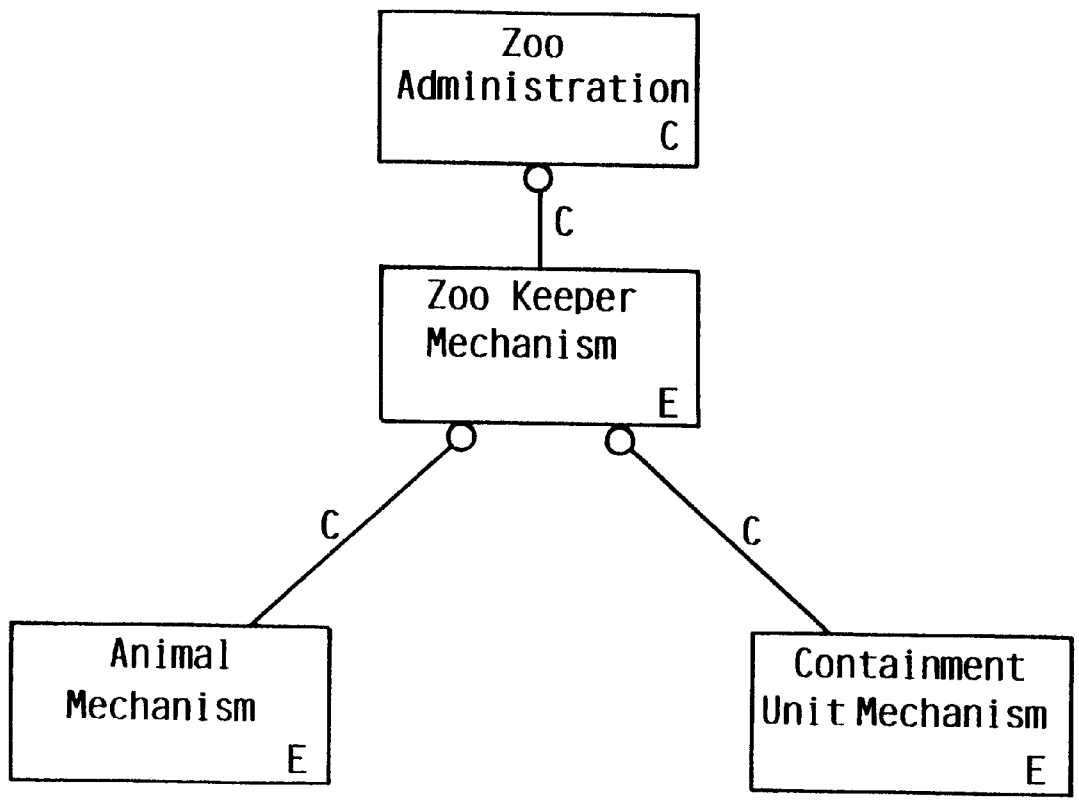
FIG. 1 is a category diagram of an example framework mechanism.

As discussed in the Summary section, the present invention was developed using Object-oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

Object-Oriented Technology v. Procedural Technology

Though the present invention relates to a particular OO technology (i.e., OO framework technology), the reader must first understand that, in general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Said another way, OO technology is significantly different from procedural technology because problems are broken down into sets of cooperating objects instead of into hierarchies of nested computer programs or procedures.

The Term Framework

There has been an evolution of terms and phrases which have particular meaning to those skilled in the art of OO design. However, the reader should note that one of loosest definitions in the OO art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

OO Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers) because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

ZAF—An Illustrative Framework Mechanism

While those skilled in the art appreciate that framework design is necessarily an intertwined and iterative process, example design choices for a simplistic framework mechanism are set forth in the paragraphs that follow. It should be understood, though, that this is only an example framework that is being used in this specification to illustrate and best explain framework mechanisms such that the reader can understand and appreciate the benefits and advantages of the present invention.

Framework designers determine what objects are needed for a framework mechanism by selecting objects from what is called the problem domain. The problem domain is an abstract view of the specific problem at hand. The example problem domain chosen for this illustrative framework mechanism is that of zoo administration. The specific problem is that of designing a mechanism that assists zoo keepers in the care and feeding of zoo animals. In our example of a Zoo Administration Framework (ZAF), an OO framework designer would look to the zoological problem domain and decide that any ZAF would of necessity involve a mechanism that represented the relationship between zoo keepers and animals (i.e., to represent how zoo keepers care for animals). The framework designer would also likely recognize that zoo animals usually live in cages, pens, tanks, and other sorts of containment units. Therefore, our framework designer would start with the idea that the framework would have to involve mechanisms that represented all of these fundamental entities and relationships.

How ZAF is Designed

To begin the design process, our framework designer would likely begin with what is called a category diagram. Category diagrams are used to describe high level framework mechanisms, and how those mechanisms relate to one another. FIG. 1 is a category diagram for the example framework ZAF. The notation used in FIG. 1, and that used in the other figures of this specification, is explained in detail in the Notation section at the end of this specification (pages 37–43). Each mechanism in a category diagram represents groupings of objects that perform a particular function. For the purposes of illustration, assume that our framework designer decides that ZAF should be made up of four high level mechanisms: a zoo administration mechanism, a zoo keeper mechanism, an animal mechanism, and a containment unit mechanism.

As shown in FIG. 1, the zoo administration mechanism has been designed to use the zoo keeper mechanism to administer the zoo. The zoo administration mechanism is therefore said to have a using relationship with the zoo keeper mechanism. (Again, please refer to the notation section of this specification for an explanation of this relationship and the other notation used in this specification.)

As discussed, the zoo administration mechanism has been designed to have responsibility for overall control of ZAF. Accordingly, the zoo administration mechanism is responsible for scheduling the operation of the zoo keeper mechanism. Note also that our framework designer designed the zoo administration mechanism to be a core function of ZAF, which means that it has been designed such that it will not be subject to potential customization and extension. The C in the category box denotes this fact. Please note further that the uses relationship between the zoo administration mechanism and the zoo keeper mechanism has also been designed such that it is not available for ultimate customization by the framework consumer.

The zoo keeper mechanism has been designed to be generally responsible for the care and feeding of the zoo animals. Accordingly, it uses the animal and containment unit mechanisms to perform its tasks. However, unlike the design of the zoo administration mechanism, our framework designer has designed the zoo keeper mechanism to be extensible function, which again means that the zoo keeper mechanism has been designed to be available for modification and/or extension by the framework consumer to address future care and feeding requirements. This fact is denoted by the E in the zoo keeper mechanism category box.

Our framework designer has designed the animal mechanism to represent the animal side of the interaction between zoo animals and zoo keepers. Since the animal population in the zoo is something that changes on a regular basis, the animal mechanism has similarly been designed as an extensible function. The containment unit mechanism interacts with the zoo keeper mechanism by representing individual containment units such as pens, tanks, and cages. Like the animal mechanism, the containment unit mechanism has been designed as an extensible function such that it can handle future customization and extension requirements. Please note here, however, that even though the zoo keeper, zoo animal, and containment unit mechanisms have all been designed as extensible function, the relationships between the mechanisms have been designed to be a core function of ZAF. In other words, even though it is desirable to give ZAF's consumers flexibility relative to the zoo keeper, zoo animal, and containment unit mechanisms, it is not desirable to allow ZAF's consumers to change how these mechanisms relate to one another.

Our framework designer would next design the classes and relationships that make up the mechanisms shown on FIG. 1. A class is a definition of a set of like objects. As such, a class can be thought of as an abstraction of the objects or as a definition of a type of object. From the view of a computer system, a single object represents an encapsulated set of data and the operation or a group of operations that are performed by a computer system upon that data. In fact, in a secure computer system, the only access to the information controlled by an object is via the object itself. This is why the information contained in an object is said to be encapsulated by the object.

Each class definition comprises data definitions that define the information controlled by the object and operation definitions that define the operation or operations performed by objects on the data that each object controls. In other words, a class definition defines how an object acts and reacts to other objects by defining an operation or set of operations that is/are performed on the defined data. (Please note that operations are sometimes called methods, method programs, and/or member functions.) When taken together, the defined operation(s) and data are said to be the behavior of the object. In essence, then, a class definition defines the behavior of its member object or objects.

Figure 2A:
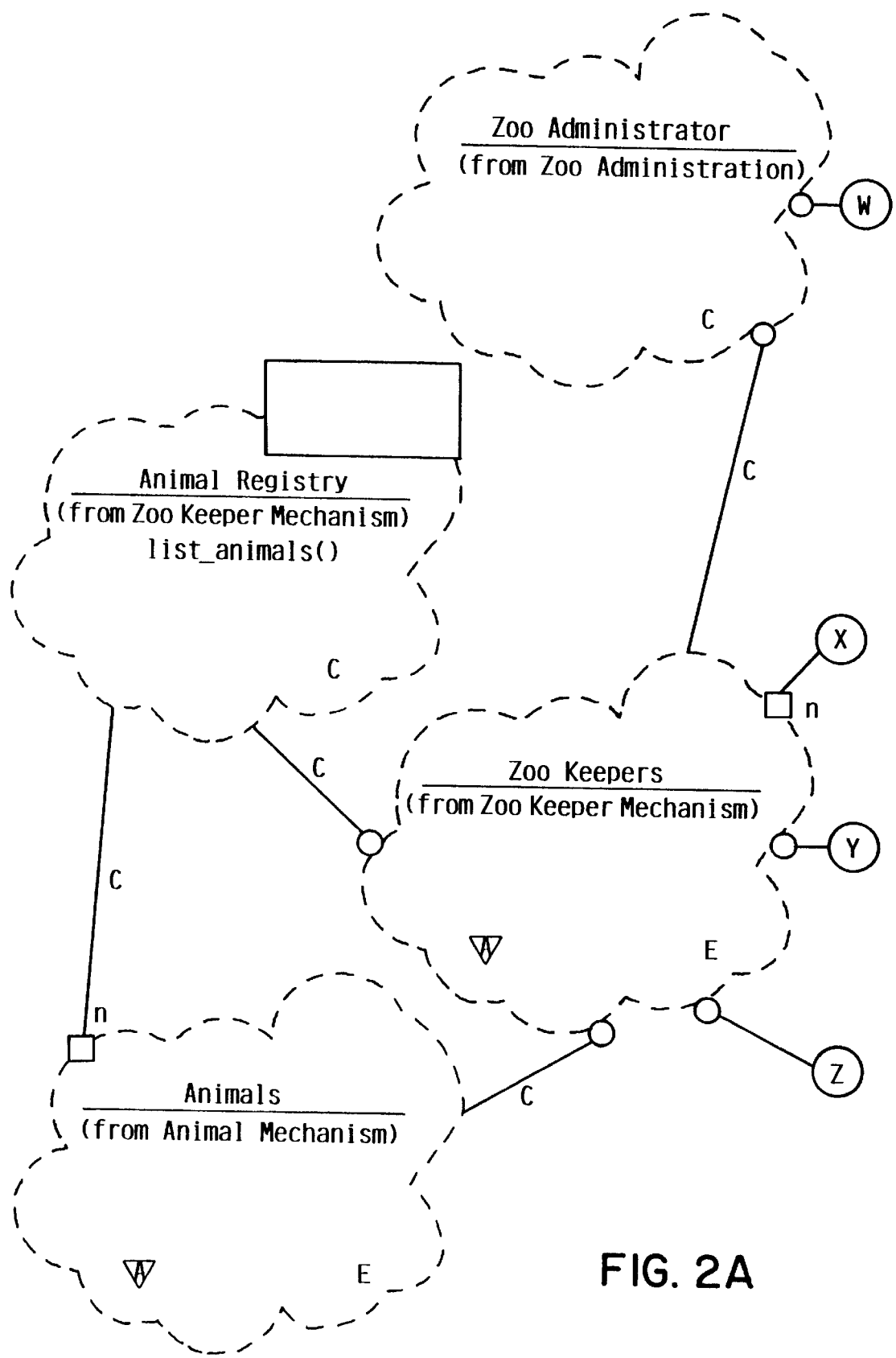
FIGS. 2 through 6 are class diagrams for the example framework mechanism of FIG. 1.
Figure 2B:
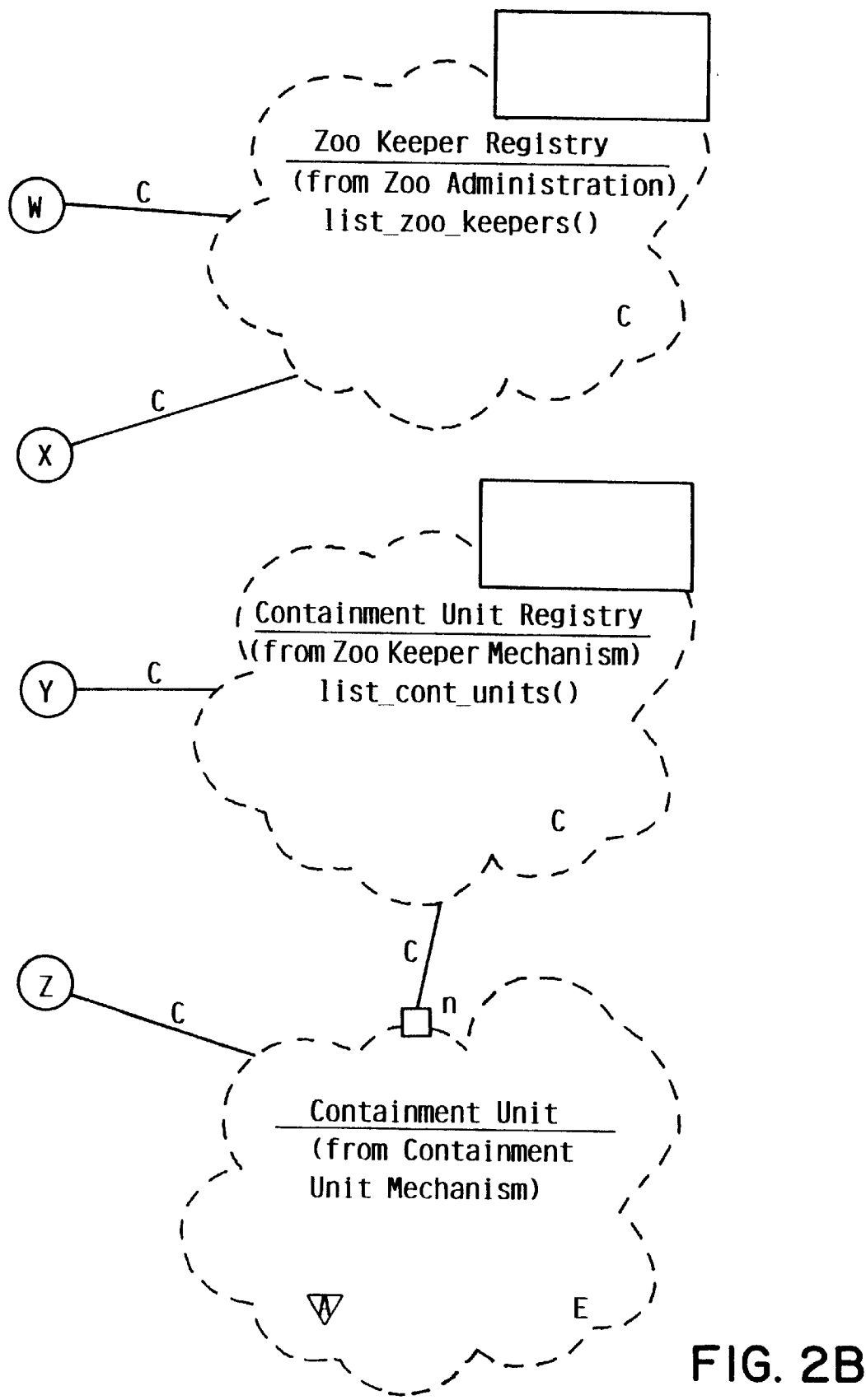

FIG. 2 is an OO class diagram that shows the fundamental classes that our framework designer has designed for ZAF. Each class representation includes its relationship to the mechanisms shown on FIG. 1. For example, we can see that the zoo keepers class is denoted as being from *Zoo Keeper Mechanism*. The fundamental classes of ZAF include: the zoo administrator class, which is part of the zoo administration mechanism; the zoo keeper registry class, which is also part of the zoo administration mechanism; the animal registry class, which is part of the zoo keeper mechanism; the zoo keepers class, which is also part of the zoo keeper mechanism; the containment unit registry class, which is also part of the zoo keeper mechanism; the animals class, which is part of the animal mechanism; and the containment unit class, which is part of the containment unit mechanism.

Please note again that the relationships between the classes have been designed as core function of ZAF such that they are not available for ultimate modification by ZAP's consumers.

The zoo administrator class is the definition of the object that is responsible for the overall control of ZAF. Again, OO classes only define the objects that interact to provide a solution to the problem. However, it is by exploring the characteristics of the class definitions that we are able to understand how the objects of the framework mechanism have been designed to provide a living solution that can be customized and/or extended to address future requirements.

The zoo administrator class has been designed to have a uses relationship with the zoo keeper registry. Our framework designer has designed the zoo administrator and zoo registry classes to be a core function of ZAF because our designer has decided that ZAF's consumers should not be allowed to modify the behavior of objects that are members of these class definitions. The zoo keeper registry, which has what is called a contains by reference relationship with the zoo keeper class, is simply a class that defines an object that is a container for all zoo keeper objects. Accordingly, the zoo keeper registry includes a definition for a list_zoo_keepers() operation. As will be described later, this operation is responsible for providing a list of zoo keeper objects to other objects that request such a list.

Figure 3:
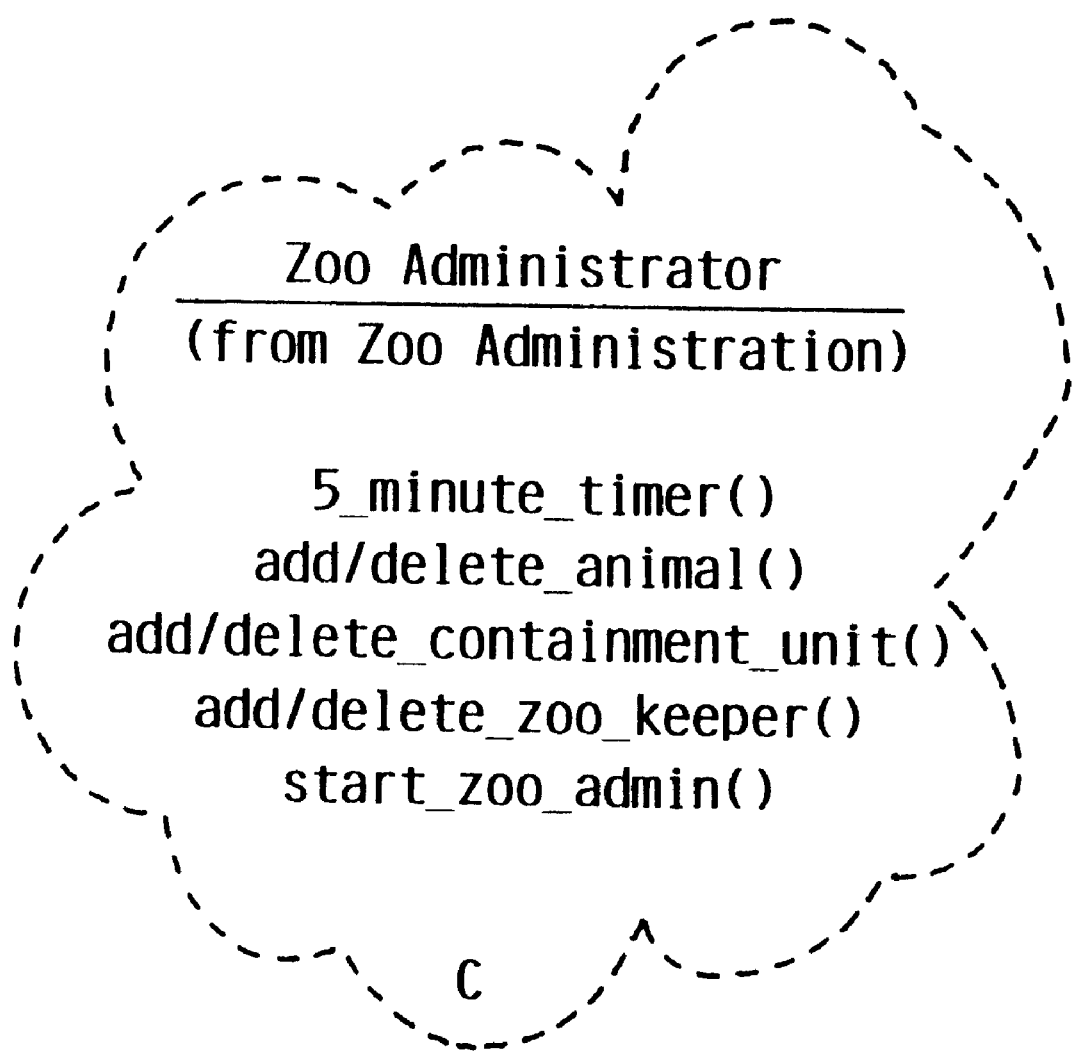

FIG. 3 shows a lower level view of the zoo administrator class. Since objects of type zoo administrator have responsibility for overall control of ZAF, the zoo administrator class has been designed to include operations that perform tasks oriented towards zoo administration. The class definition includes the following five operations: 5_minute_ timer(), add_animal(), add_containment_unit(), add_zoo_keeper(), and start_zoo_admin().

The start_zoo_admin() operation is responsible for starting ZAF. That is, a user or system administrator will interact with the start_zoo_admin() operation to begin administration of a zoo via ZAF. Once started, our framework designer has designed the start_zoo_admin() operation to initiate the 5_minute_timer() operation. Every five minutes, the 5_minute_timer() operation instructs the zoo keeper objects to go out and check on the animals. The add/delete_zoo_keeper operation is responsible for interacting with users of ZAF to define additional zoo keepers (i.e., additional zoo keeper classes), to add additional zoo keepers (i.e., zoo keeper objects), and to remove zoo keeper classes and/or objects. As will become clear in the forthcoming paragraphs, each zoo keeper object is responsible for performing a particular zoo task. Therefore, it is natural that a user of ZAF might well want to add a zoo keeper definition and object to handle an additional zoo task or to remove a definition or object that is no longer needed. As will be seen, this flexibility is provided by designing the zoo keeper mechanism as an extensible function.

Like the add/delete_zoo_keeper operation, the add/delete_animal() operation is responsible for interacting with users to define additional zoo animal classes and objects and to remove classes and objects that are no longer needed. Again, it is quite natural for a zoo to need to add and remove animals. The add/delete_containment_unit() operation is responsible for the definition of new containment unit classes and objects and for removal of classes and/or objects that are no longer necessary. Again, our framework designer has designed ZAF in a way that provides this flexibility by designing the animal and containment unit mechanisms as extensible functions.

Referring back to FIG. 2, the zoo keepers class definition has a uses relationship with the animal registry, animals, containment unit registry, and containment units classes. Since the value of ZAF is enhanced by allowing ZAF's consumers to customize and extend the zoo keepers, animals, and containment unit classes, these classes have been designed as extensible function. However, changing the behavior of the animal and containment unit registry classes would disrupt the basic operation of ZAF. Therefore, these classes have been designed to be core functions of ZAF.

While the classes and categories within ZAF have been described as either core functions or extensible functions, it is important to note that the term "core function" as used herein broadly relates to requirements that cause the framework to operate in the desired manner. In simple terms, core functions of a framework are the functions that any program that uses the framework will perform. The requirements of core functions may be imposed by the structure of the framework (e.g., by designating certain classes as core functions) or may be imposed by functional requirements that dictate how a framework consumer may utilize the framework. Thus, core functions include not only the classes and class relationships that are designated as core, but may also include extensible classes that must be implemented in particular ways for the framework to function properly. Said another way, while extensible function is that part of the framework that is designed to be customized by the framework consumer, the nature and extent of the customization is governed by the requirements of the framework's core function (i.e., the overall framework function imposed by the structure and functional requirements of the framework). For example, the animals class has been designed as extensible function of ZAF so that ZAF can be customized to accommodate different types of animals. However, the ability to customize the extensible animals class does not imply that the nature of the customization can violate the basic structure imposed by the core function of ZAF (e.g., by customizing the animal class to the extent that it can no longer be reasonably said to represent a type of animal).

Figure 4:
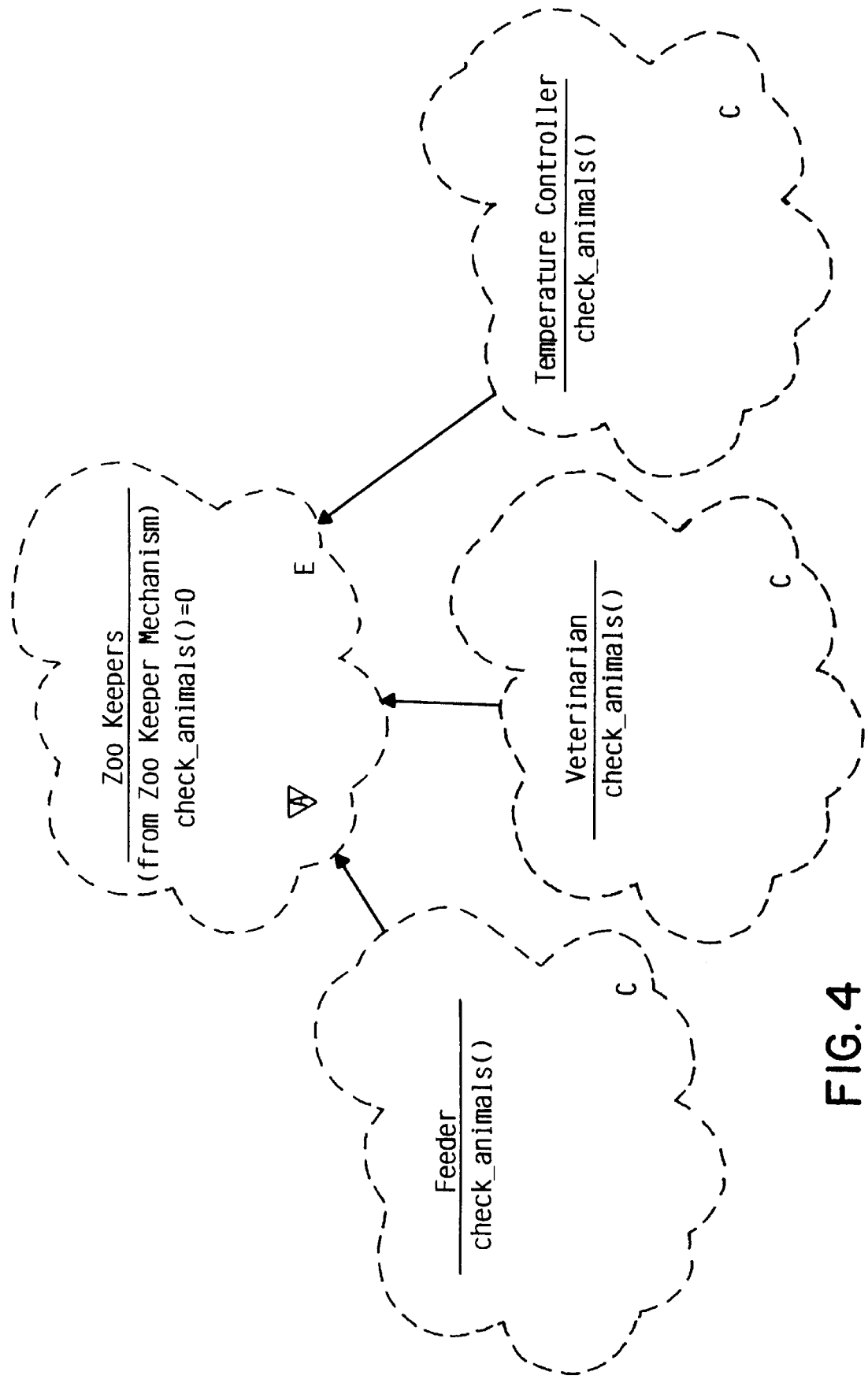

FIG. 4 is a class diagram of the zoo keeper class. However, before describing the details of FIG. 4, it is worthwhile to point out that the class definitions shown on FIG. 4 are ranked in a very simple ordering called a class hierarchy. A class, like the zoo keeper class, that represents the most generalized/abstract class in a class hierarchy is referred to as the base class of the hierarchy. The ordering of classes in a class hierarchy goes from most general to least general (i.e., from general to specific). Less general classes (e.g., the feeder class) are said to inherit characteristics from the more general class or classes (i.e., the zoo keeper class in this case). As such, class definitions feeder, veterinarian, and temperature controller are said to be subclasses of the zoo keeper class. Inheritance mechanisms will be explored in more detail in the discussion associated with FIG. 5.

As shown on FIG. 4, the zoo keeper class definition contains a single operation definition, the check_animals() operation definition. The reader should also note that the zoo keepers class definition is marked as being an abstract class. Abstract classes are not designed to have objects created as their members, but are instead used to define a common interface/protocol for their subclasses. A class is said to be an abstract class when at least one of its operation definitions is a pure virtual operation definition. Pure virtual operation definitions are designed for the sole purpose of defining a common interface for subclass definition of that operation. In other words, the design of the actual behavior (i.e., the data and operations) is left to the subclasses themselves. In the case of the zoo keeper class definition, the feeder, veterinarian, and temperature controller subclasses define specific implementations of the pure virtual check_animals() operation definition that is contained in the zoo keeper class. An operation is marked as a pure virtual when it is set equal to 0.

It is important to note, though, that the common interface of a pure virtual operation definition must be honored by all subclasses such that requesting objects (called client objects) can use subclass member objects (called server objects) without needing to know the particular subclass of the server object. For example, whenever the object defined by the zoo administrator class needs a particular action performed, it interacts with a zoo keeper object. Because the interface to these objects was defined in abstract, base class zoo keeper and preserved in the subclass definitions for the check_animals() operation, the zoo administrator object need not have special knowledge about the subclasses of any of the server objects. This has the effect of decoupling the need for the action (i.e., on the part of the zoo administrator object) from the way in which the action is carried out (i.e., by one of the objects of the zoo keepers subclasses). Designs (like the ZAF design) that take advantage of the characteristics of abstract classes are said to be polymorphic.

Polymorphism is extremely important to OO framework design because it allows the way in which something is done (called the implementation) to be changed or extended without effecting the mechanisms that depend on the fact the action is actually performed. In other words, client objects need only understand that certain objects perform certain functions, not how those functions are actually carried out. This is one way in which a properly designed framework can be readily customized and extended to satisfy future requirements.

Figure 5:
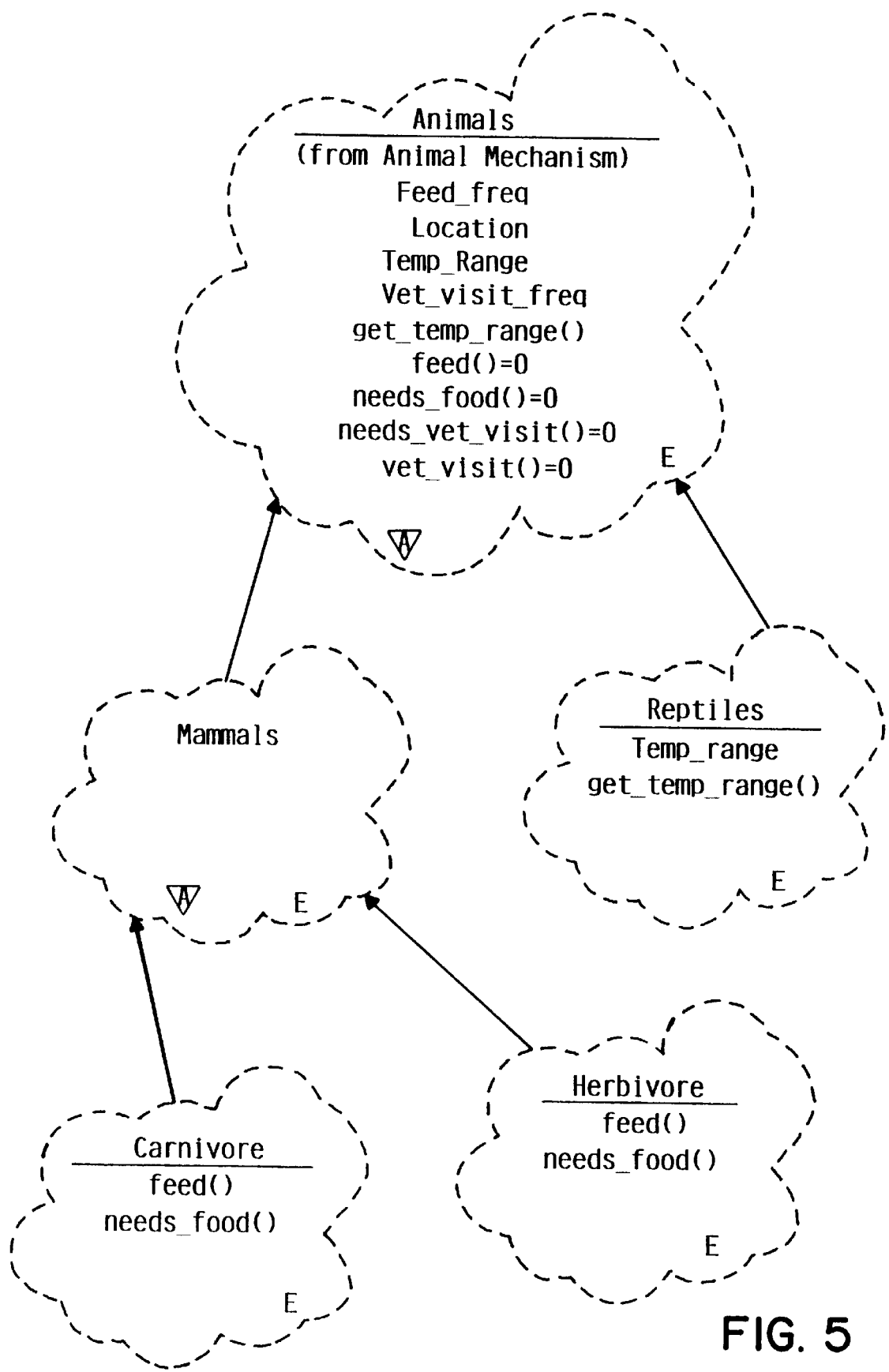

As previously discussed, our framework designer has designed ZAF such that zoo keeper objects interact with animal and containment unit objects to perform their tasks. FIG. 5 is a class diagram for the class hierarchy of the abstract class animal. Since the animals class definition is responsible for representing the characteristics and behavior of zoo animals, the framework designer has designed abstract class animal in a way that reflects this responsibility. As shown, the example animal class definition includes data definitions feed_freq, location, and temp_range and operation definitions get_temp_range(), feed(), needs_food(), needs_vet_visit(), and vet_visit().

For the purposes of this framework overview, it is not necessary to explore each definition in detail. However, the temp_range data definition and the get_temp_range() and feed() operation definitions are good examples of well thought out framework design choices.

The feed() operation definition is designed to perform the actual feeding of the animals (i. e., through specific feeding apparatus which is not shown). The feed() operation is a pure virtual operation. Again, this means that the design of the class is such that the actual mechanism that performs the needed function has been left to be defined by the subclasses. Requiring subclass definition is a good design choice in cases like this where objects that are created as members of the subclasses have particularized needs. In ZAF, for example, each type of animal is likely to have need for a particularized feeding apparatus, which not only makes definition of a generic feed() operation difficult, but valueless.

By way of comparison, the framework designer has explicitly designed the get_temp_range() operation such that it is not a pure virtual operation definition. This means that get_temp_range() has been generically defined as a default operation. As such, it is considered a virtual operation. Default operations are used to provide generic function to subclasses. The subclasses can simply use the default operations or they can customize or extend the default operations by redefinition. Redefinition of a default operation is called overriding the default operation.

Mammals is a subclass of class animals, and as such, mammals inherits all of the characteristics of class animals. Please note that class mammals is also designed as an abstract class, which again means that it has not been designed to have objects created as its members, but has instead been designed to provide a common interface for its subclasses. Subclass mammal is further subclassed into classes carnivore and herbivore.

Since definition of the feed() operation has been left up to the subclasses, subclasses carnivore and herbivore each have their own definition of the feed() operation. Again, this is a good design choice because meat eating carnivores are going to have different needs than their plant eating counterparts.

Temp_range is a data definition for the range of temperatures that coincides with that of the specific animal's natural habitat and the get_temp_range() operation definition is designed to retrieve the temp_range for a specific animal and return it to a requesting client object. Subclass reptiles contains its own data definition for temp_range and its own definition for the get_temp_range() operation. ZAF has been designed this way to point out that data definitions can be overridden just like operation definitions. Since many reptiles live in desert conditions, where nights can be very cold and days very hot, the default temp_range definition has been overridden in the reptiles class to include time and temperature information (not explicitly shown on FIG. 5).

This is another good design choice because it allows ZAF to treat reptile containment units differently than other containment units by allowing temperature adjustments to be made based on the time of day as well as on the current temperature of the containment unit itself.

Figure 6:
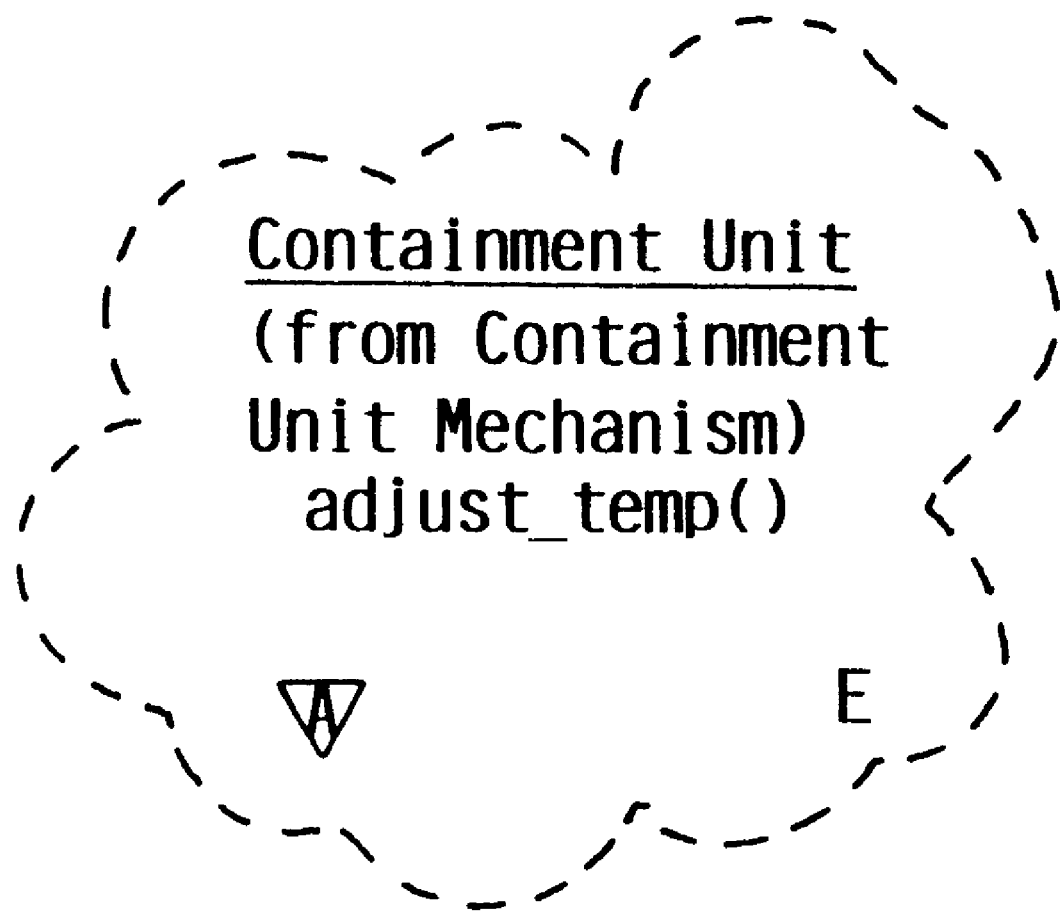

FIG. 6 is a class diagram showing a lower level view of the containment unit class. The containment unit class contains virtual operation definition adjust_temp(). The adjust_temp definition defines both the interface and mechanism used to actually adjust the temperature in the containment units of the zoo (i.e., via heating and cooling mechanisms which are not shown).

How the ZAF Objects Interact

Beyond designing the objects that make up the solution to the specific problem, our framework designer must also design how the individual objects interrelate. In other words, the objects must interrelate in way that takes advantage of the manner in which they were designed. As discussed, the way in which the defined operations of an object operate on the data defined for the object is called the object's behavior. While objects may be characterized as autonomous entities, it is still very important that each object exhibit a consistent behavior when interrelating with other objects. Consistent behavior is important because objects depend upon the consistent behavior of other objects so that they themselves can exhibit consistent behavior. In fact, consistent behavior is so important that an object's behavior is often referred to as the contract the object has with the other objects. When an object does not exhibit a consistent behavior, it is said to have violated its contract with the other objects.

When an operation of one object needs access to the data controlled by a second object, it is considered to be a client of the second object. To access the data controlled by the second object, one of the operations of the client will call or invoke one of the operations of the second object to gain access to the data controlled by that object. One of the operations of the called object (i.e., a server operation in this case) is then executed to access and/or manipulate the data controlled by the called object.

Figure 7A:
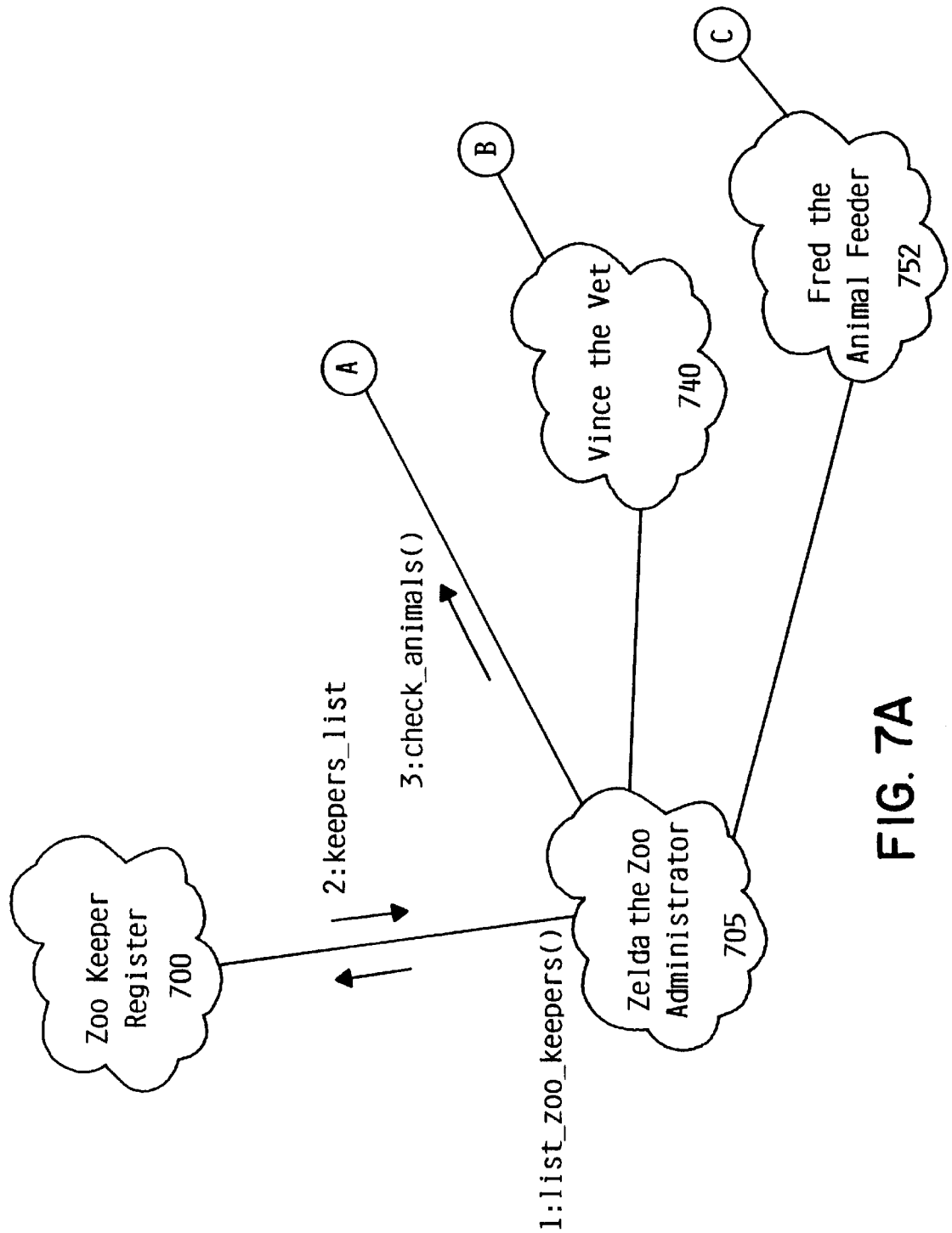
FIG. 7 is an object diagram for the example framework mechanism of FIGS. 1 through 6.
Figure 7B:
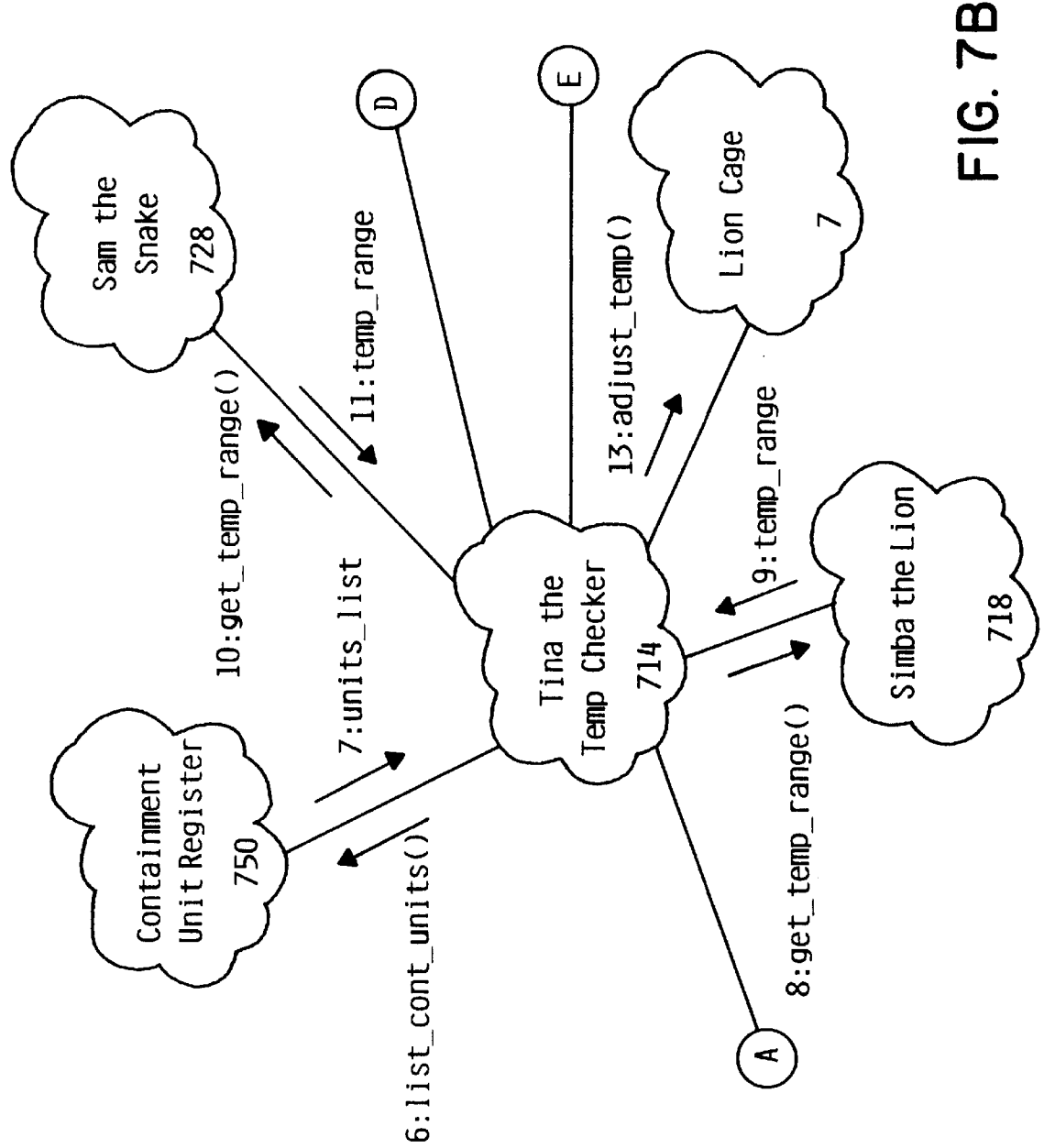
Figure 7C:
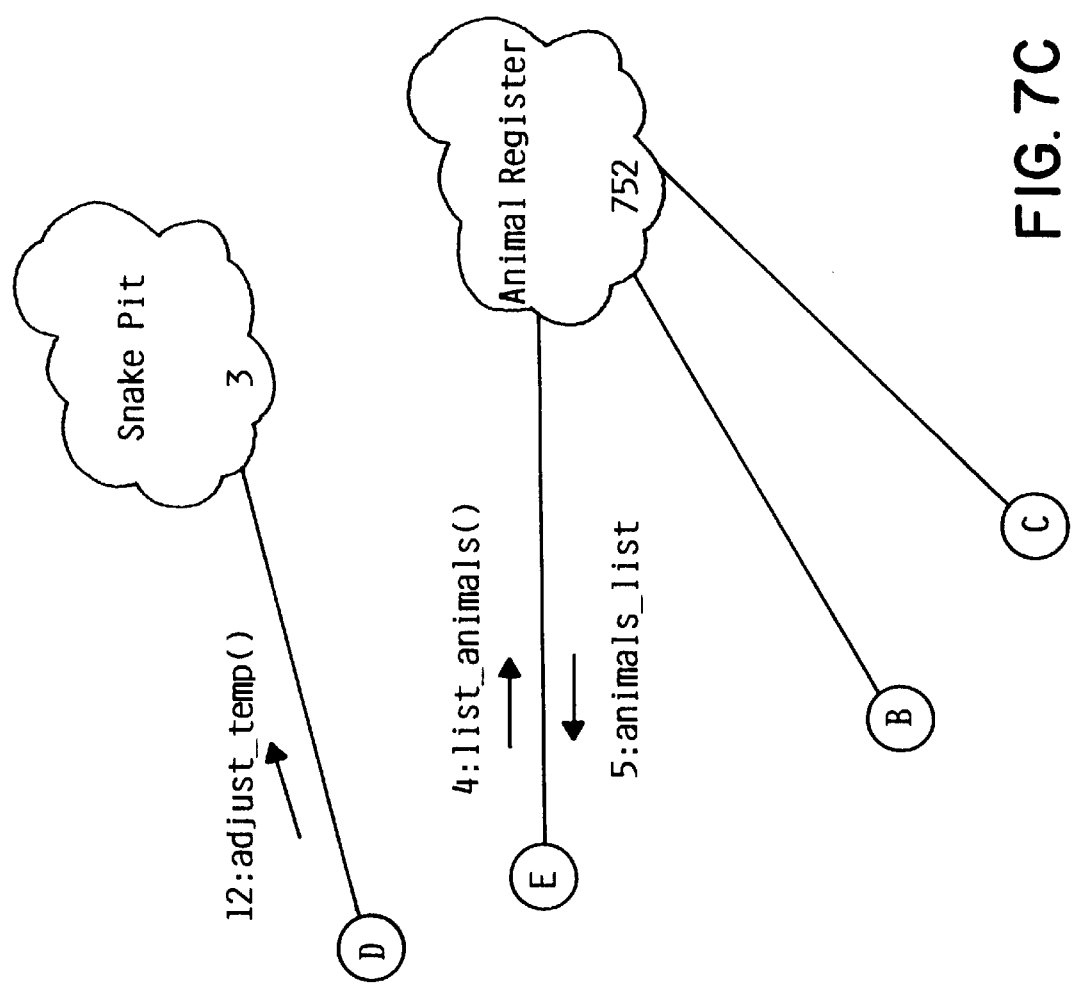

FIG. 7 is an object diagram showing how the example objects of ZAF interact to assist zoo personnel in operating the zoo. A detailed analysis of the interaction of all of the ZAF objects is unnecessary for the purposes of this overview. However, the reader should review the following simple control flow to obtain a rudimentary understanding of how objects interact to solve problems.

As mentioned, an object is created to be a member of a particular class. Therefore, Zelda the Zoo Administrator [object 706] is an object that is a member (actually the only member) of the zoo administrator class. As such, object Zelda is responsible for overall control of ZAF. All of the zoo keeper objects have registered with the Zoo Keeper Register object [object 700]. Therefore, object Zelda obtains a list of the current zoo keepers by calling the list_zoo_keepers() operation [step 1] of the Zoo Keeper Register object. The Zoo Keeper Register object has been created as a member of the zoo keeper register class. For the purposes of illustration, assume that this occurs every five minutes as part of Zelda's 5_minute_timer() operation. The Zoo Keeper Register object then responds with the zoo keepers list [step 2]. The list of zoo keepers includes Tina the Temperature Checker [object 714], Vince the Vet. [object 740], and Fred the Animal Feeder [object 752]. Each zoo keeper has been created as a member of the zoo keepers class. In particular, objects Tina the Temp. Checker, Vince the Vet., and Fred the Feeder are respectively members of the temperature controller, veterinarian, and feeder subclasses.

Once the list of current zoo keepers has been returned to object Zelda, object Zelda instructs each zoo keeper in the list to check the animals by calling the check_animals() operation of each zoo keeper object [only the call to Tina the Temp. Checker is shown—step 3]. Please note that object Zelda did not need to understand the types of zoo keepers that were in the zoo keeper list, the number of zoo keeper objects in the list, or the specialized characteristics of any one zoo keeper object. Object Zelda uses the same interface (i.e., the check_animals() operation) to communicate with each zoo keeper object. It is then up to the individual zoo keeper objects to perform the task for which they have been created. Each zoo keeper object performs its assigned task through use of its own check_animals() operation. For example, object Tina's check_animals() operation retrieves a list of current animals from the animal registry object by calling the list_animals() operation [step 4] and then a list of containment units from the containment unit register object by calling the list_cont_units() operation [step 6]. Upon examining the animal list, object Tina's check_animals() operation determines that there are only two animals currently registered in the zoo, Sam the Snake [object 728] and Simba the Lion [object 718].

Object Tina's check_animals() operation then calls the get_temp_range() operations to get temperature ranges from objects Sam and Simba [steps 8 and 10]. Once the temperature ranges have been returned, the check_animals() operation of object Tina determines which containment units house the respective animals (i.e., Simba and Sam) and then calls the adjust_temp() operation of the appropriate containment unit (i. e., Lion Cage 7 in the case of object Simba and Snake Pit 3 in the case of object Sam) to adjust the temperature of the containment units [steps 12 and 13].

The adjust_temp() operation of each containment unit then completes the control flow by proceeding to adjust the temperature in a way that is appropriate for the animals contained in each containment unit. (That is, the temperature is adjusted based on time and temperature for Snake Pit 3 and based on time alone for Lion Cage 7.) The reader should note that the relationship between the check_animals() operation and the adjust temp() operations is polymorphic. In other words, the check_animals() operation of object Tina does not require specialized knowledge about how each adjust_temp() operation performs its task. The check_animals() operation merely had to abide by the interface and call the adjust_temp() operations. After that, it is up to the individual adjust_temp() operations to carry our their tasks in the proper manner.

At this point, it is again worthwhile to point out that the ZAF mechanism is an extremely simplistic framework mechanism that has been presented here to help novice readers understand some basic framework concepts so as to best appreciate the benefits and advantages of the present invention. These benefits and advantages will become more clear upon reference to the following Detailed Description.

DETAILED DESCRIPTION

Figure 8:
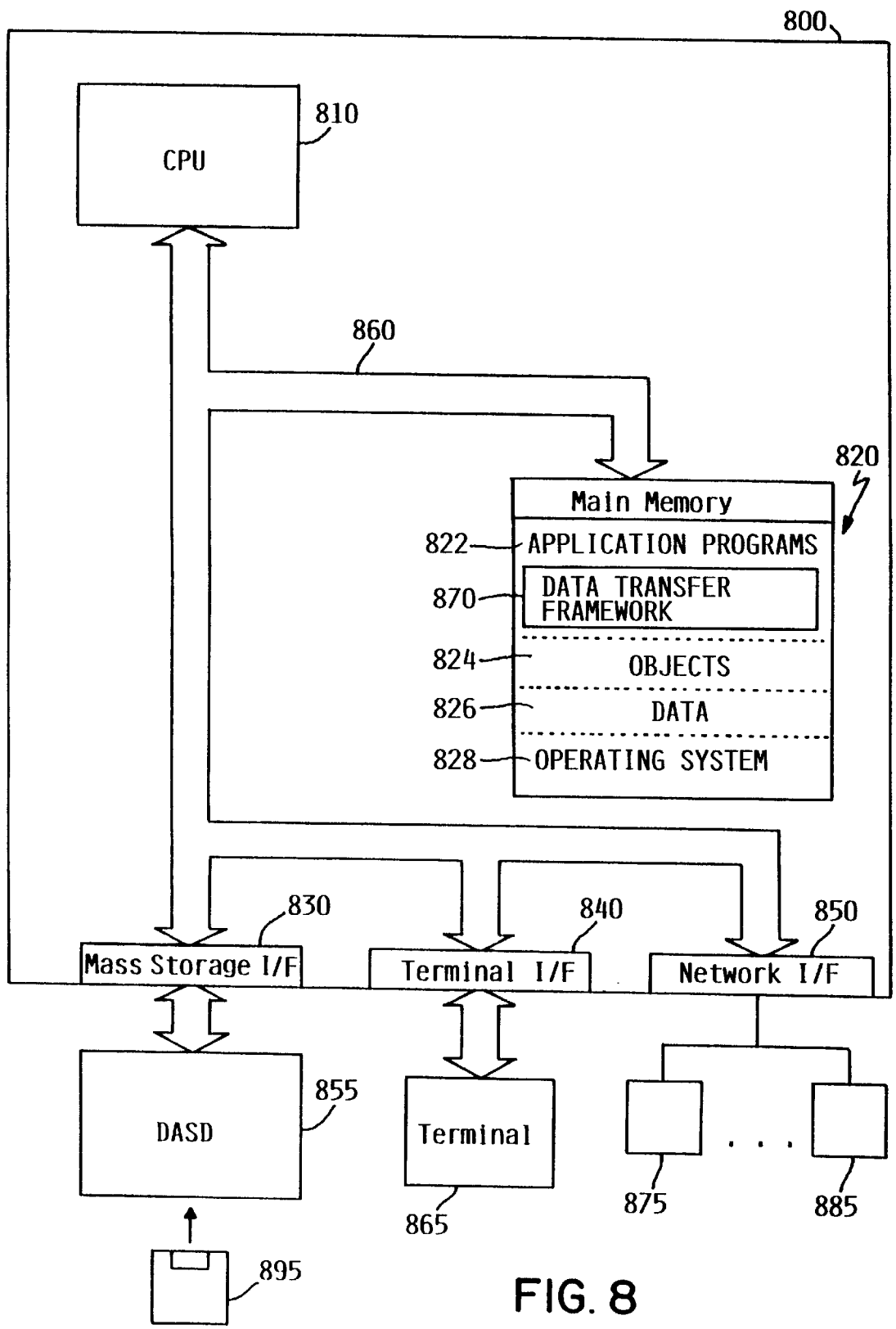
FIG. 8 is a block diagram of the computer system used in the preferred embodiment.

FIG. 8 shows a block diagram of a computer system 800 in accordance with the present invention. The computer system of the preferred embodiment is a computer system such as an AIX platform. However, those skilled in the art will appreciate that the mechanisms and apparatus of the present invention apply equally to any computer system, regardless of whether the computer system is a complicated multi-user computing apparatus or a single user workstation. As shown in the exploded view of FIG. 8, computer system 800 comprises main or central processing unit (CPU) 810 connected to main memory 820, mass storage interface 830, terminal interface 840, and network interface 850. These system components are interconnected through the use of a system bus 860. Mass storage interface 830 is used to connect mass storage devices (such as DASD device 855) to computer system 800. One specific type of DASD device is a floppy disk drive, which may store data to and read data from a floppy diskette 895.

Main memory 820 contains application programs 822, objects 824, data 826, and an operating system 828. Computer system 800 utilizes well known virtual addressing mechanisms that allow the programs of computer system 800 to behave as if they only have access to a large, single storage entity (referred to herein as computer system memory) instead of access to multiple, smaller storage entities such as main memory 820 and DASD device 855. Therefore, while application programs 822, objects 824, and operating system 828 are shown to reside in main memory 820, those skilled in the art will recognize that these programs are not necessarily all completely contained in main memory 820 at the same time. Note that the term "computer system memory" is used herein to generically refer to the entire virtual memory of computer system 800.

Operating system 828 is a suitable multitasking operating system such as AIX; however, those skilled in the art will appreciate that the spirit and scope of the present invention is not limited to any one operating system. Operating system 828 preferably supports an object oriented programming environment such as that provided, for example, by the C++ programming language. One or more application programs 822 provide a programming environment for computer system 800, and include a data transfer framework mechanism 870, which is preferably an object oriented framework mechanism. Framework mechanism 870 contains instructions capable of being executed on CPU 810 and may exist anywhere in the virtual memory space of computer 800. In particular, data transfer framework mechanism 870 may reside within operating system 828.

Although computer system 800 is shown to contain only a single main CPU and a single system bus, those skilled in the art will appreciate that the present invention may be practiced using a computer system that has multiple CPUs and/or multiple buses, whether contained in a single unit or distributed across a distributed processing computer system. In addition, the interfaces that are used in the preferred embodiment each include separate, fully programmed microprocessors that are used to off-load compute-intensive processing from CPU 810. However, those skilled in the art will appreciate that the present invention applies equally to computer systems that simply use I/O adapters to perform similar functions.

Terminal interface 840 is used to directly connect one or more terminals 865 to computer system 800. These terminals 865, which may be non-intelligent or fully programmable workstations, are used to allow system administrators and users to communicate with computer system 800.

Network interface 850 is used to connect other computer systems and/or workstations (e.g., 875 and 885 in FIG. 8) to computer system 800 in networked fashion. The present invention applies equally no matter how computer system 800 may be connected to other computer systems and/or workstations, regardless of whether the connection to the network is made using present-day analog and/or digital techniques or via some networking mechanism of the future. It is also important to point out that the presence of network interface 850 within computer system 800 means that computer system 800 may engage in cooperative processing with one or more other computer systems or workstations. Of course, this in turn means that the programs shown in main memory 820 need not necessarily all reside on computer system 800. For example, one or more application programs 822 may reside on another system and engage in cooperative processing with one or more programs that reside on computer system 800. This cooperative processing could be accomplished through use of one of the well known client-server mechanisms such as remote procedure call (RPC).

At this point, it is important to note that while the present invention has been (and will continue to be) described in the context of a fully functional computer system, those skilled in the art will appreciate that the present invention is capable of being distributed as a program product via floppy disk (e.g., 895 of FIG. 8), CD ROM, or other form of recordable media, or via any type of electronic transmission mechanism.

Data Transfer Framework Mechanism of the Present Invention

The data transfer framework mechanism disclosed herein provides an architecture for transferring data from a data source to a data target within a computer system. Extending the framework to accommodate data transfer between a specific data source and a specific data target defines a "data transfer environment." For example, for computer system 800 of FIG. 8, if data needs to be transferred from workstation 875 to DASD 855, a data transfer environment may be created by extending the framework to define the data source as workstation 875, the data target as DASD 855, and to define appropriate transfer parameters and protocols that allow the data to be transferred. Note that the terms "data source" and "data target" are encompassing terms that may refer to any portion of a computer system that is capable of sending or receiving data.

By providing framework mechanism 870 to perform data transfers within computer system 800, a uniform interface for all data transfer tools may be developed. Framework mechanism 870 may replace all of the proprietary tools that are currently used on modern computer systems to automate data transfer tasks. This would allow common user interface for virtually any type of data transfer activity, which would greatly ease the burden of programming software applications that currently rely on different, incompatible tools for their data transfer needs. Thus, one of the primary benefits of the framework disclosed herein is the capability to perform data transfer from any data source to any data target within a computer system or between computer system using a simple, easy to use interface defined by the framework.

Once different data transfer environments are defined within the framework by extending appropriate extensible functions in the framework, data transfer may be performed between any data source and data target that are defined in the framework and that may communicate with each other. The communication may be performed over any suitable communications medium, including hard-wired and wireless connections, and may be within a computer (e.g., between components on the same computer platform) or may be across a distributed computer system (e.g., a local area network (LAN) or the Internet). The framework 870 of the present invention greatly improves the productivity of programmers by providing a uniform interface for all data transfer needs within a computer system.

Figure 9:
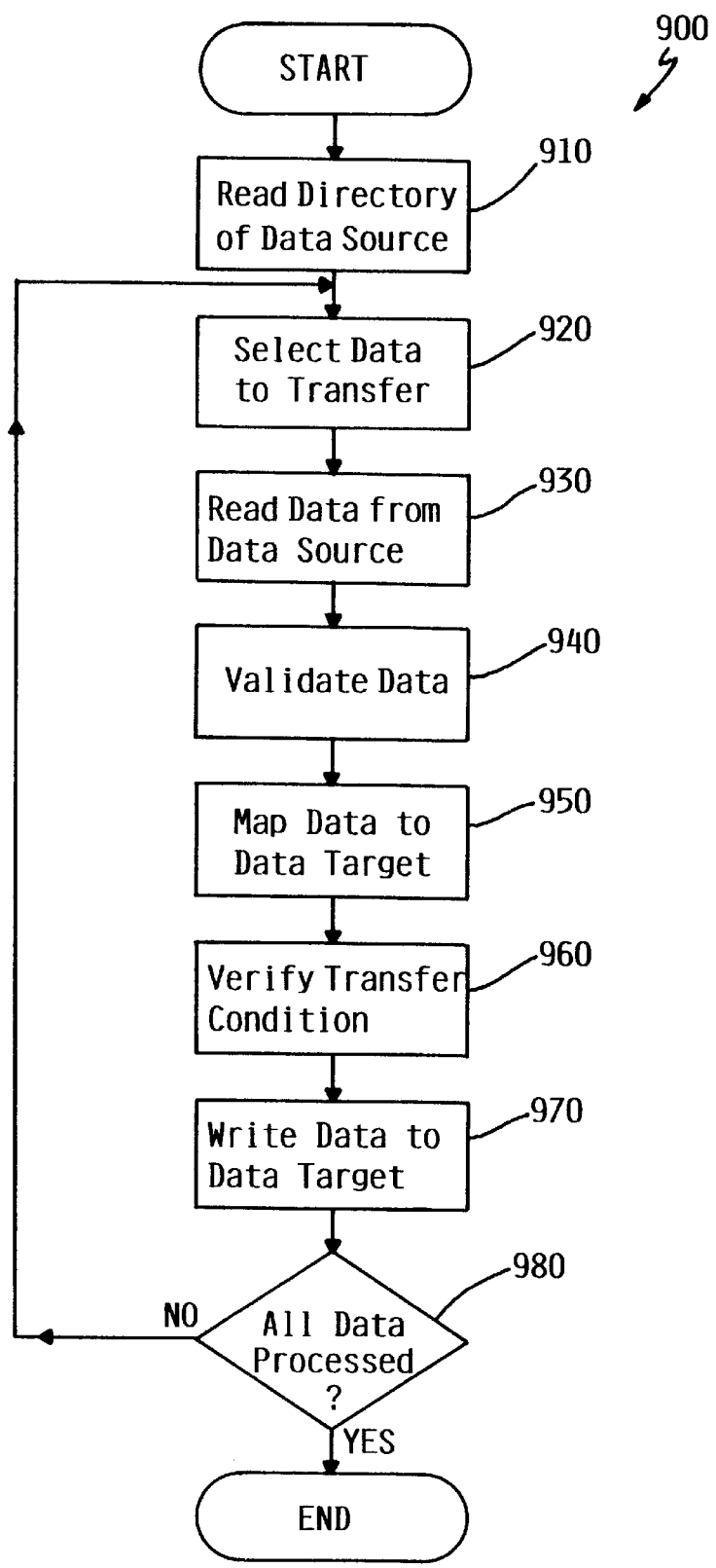
FIG. 9 is a flow diagram showing steps in accordance with the preferred embodiment to perform core functions of the framework mechanism.

Referring to FIG. 9, a framework in accordance with the preferred embodiment performs steps that comprise a method 900 for transferring data from a data source to a data target. The first step is to read the directory of the data source (step 910). The directory is used here to denote any listing of data on the data source, and is not to be construed as a limitation. Once the directory of data on the data source is read, the appropriate data to transfer is selected (step 920), and the data is read (step 930). For example, if the data source is a DASD unit, and the directory is a list of files on the DASD unit, one of those files may be selected for transfer (step 920), and the contents of the selected file is then read (step 930). Once the data has been read, the data is validated (step 940) to see if this selected data meets the established criteria for being transferred. This validation may be any type of screening of the data, including screening for specific file types or extensions, for specific data within the files, or any other suitable validation criteria.

Once data has been validated (step 940), the data is mapped to the appropriate data target (step 950). This mapping may be used to convert file formats from one type understood by the data source to a different type understood by the data target, or may be used to perform any other suitable transformation on the data being transferred. Once the mapping step is complete (step 950), the data is checked to verify that it qualifies for transfer (step 960). One suitable check is to see if the data already resides on the data target, and if so, the date of the data on the data target is compared to the date of the data on the data source. If the data on the data source is newer than the data on the data target, the data transfer would generally be allowed to take place. However, if the data on the data source is older than the data that would be overwritten on the data target, the transfer condition of step 960 is not met, and the data transfer will not occur.

Assuming transfer condition in step 960 is met, the data is written to the data target (step 970). At this point the directory is checked to see if all data on the data source has been processed (step 980). If yes, method 900 is complete. If no, the next data is selected (step 920), and the process is repeated until all data in data source has been processed (step 980=YES). While the specific implementation of each step of method 900 will vary according to the desired data transfer environment and the specific extensible functions provided by the framework user, method 900 is an illustration of several processing steps that may be performed for a large number of different configurations implemented within a single framework.

The fact that the preferred embodiment of the framework is object oriented allows the user of the framework to easily define the needed functions by subclassing from the classes defined within the framework using known object oriented programming environments, such as C++. The preferred embodiment of the present invention is an object oriented data transfer framework. While many different designs and implementations are possible, one suitable example of an object oriented data transfer framework is disclosed below to illustrate the broad concepts of the present invention.

Class Definitions

Figure 10:
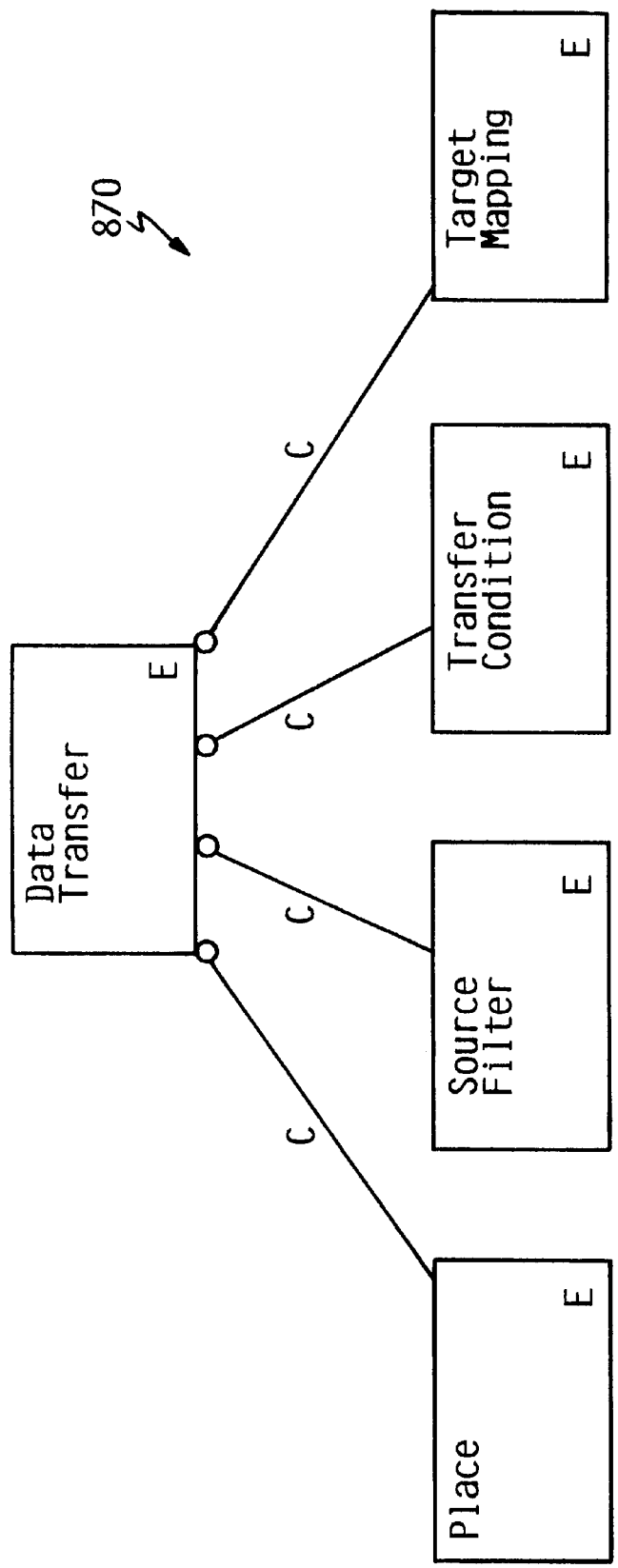
FIG. 10 is a category diagram of a framework mechanism constructed in accordance with the teachings of the preferred embodiment.

FIG. 10 is a category diagram of the data transfer framework mechanism 870 in accordance with the preferred embodiment. Those skilled in the art will appreciate that the categories illustrated in FIG. 10 represent collections of object oriented programming (OOP) classes that encapsulate data attributes and behaviors (or methods). Objects instantiated as members of these classes are stored in the main memory 820 of computer system 800. These classes may be implemented, for example, in a computer system operating environment that supports the C++ programming language.

The classes have been broken down into five categories: the Data Transfer category, the Place category, the Source Filter category, the Transfer Condition category, and the Target Mapping category. All of these categories are extensible categories (as indicated by the "E" label), meaning that users may extend the classes in these categories by defining and implementing classes that are subclasses of framework-defined classes. The Data Transfer category has a using relationship with the other four categories, indicating that classes within the Data Transfer category invoke the methods provided by the classes in these other categories. Note that these relationships between categories are core relationships (as indicated by the "C" label), meaning that the framework user cannot modify these relationships.

Figure 11A:
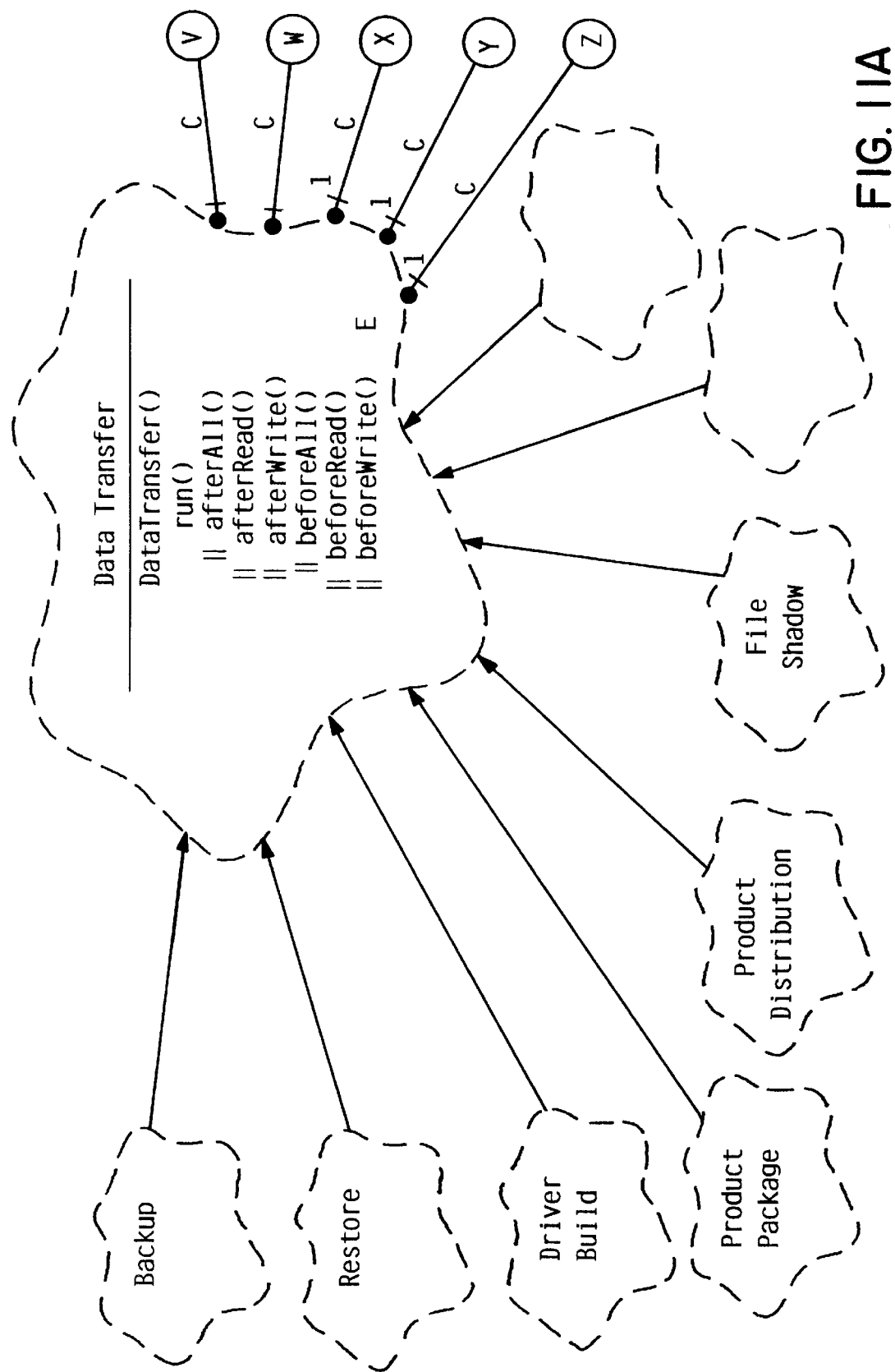
FIGS. 11–15 are class diagrams of a framework mechanism constructed in accordance with the teachings of the preferred embodiment.
Figure 11B:
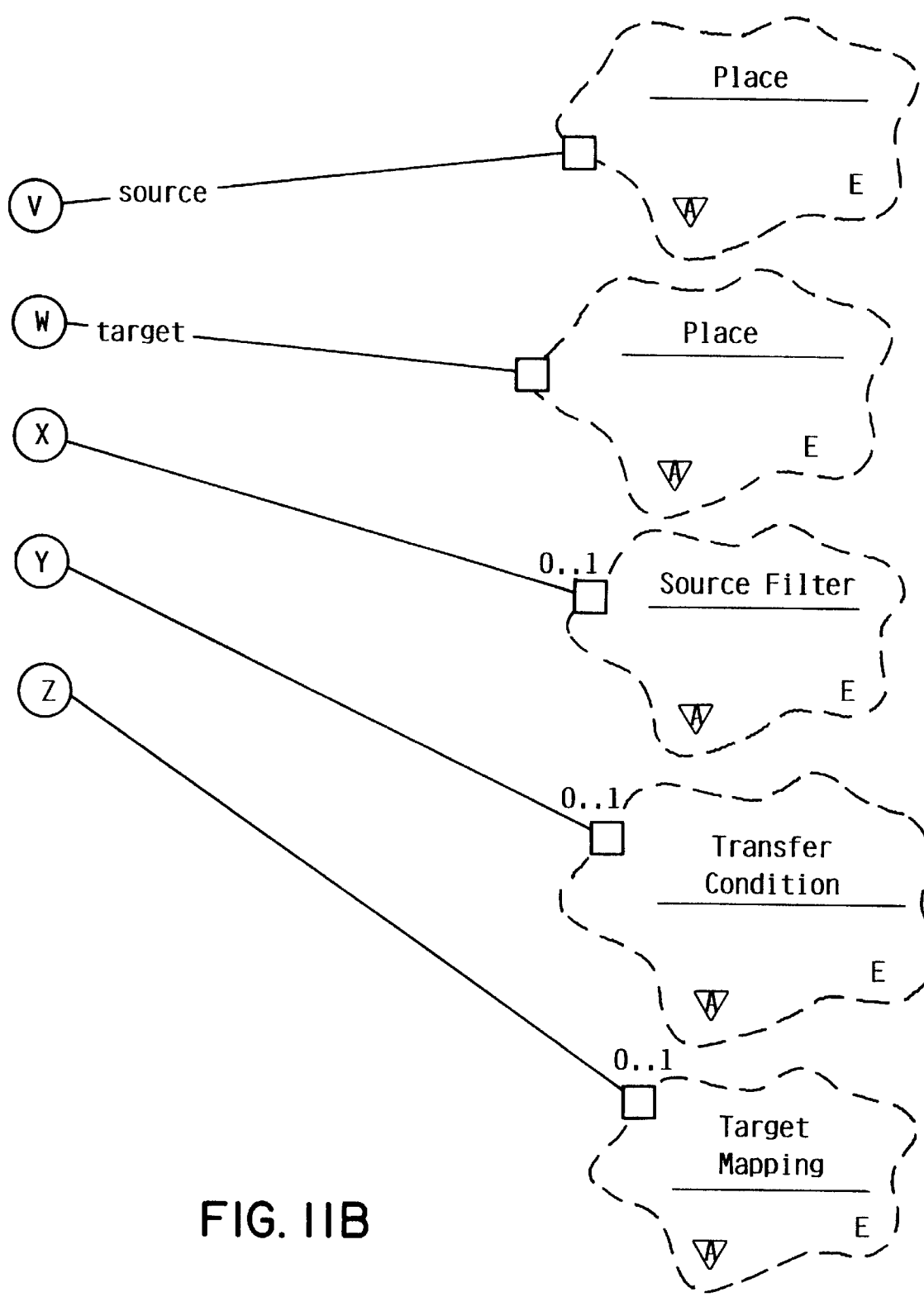

FIG. 11 is a top level class diagram of the classes used to implement data transfer framework 870. The Data Transfer class belongs to the Data Transfer category. In like manner, the Place class, the Source Filter class, the Transfer Condition class, and the Target Mapping class all belong to the respective categories of the same name. The key methods provided in each class are not shown in FIG. 11, but are shown in subsequent figures. The remaining classes in FIG. 11 (i.e., Backup, Restore, Driver Build, Product Package, Product Distribution, and File Shadow) are examples of possible data transfer environments that a user could define by appropriate subclassing of the Data Transfer class. For example, the Backup class may define a data transfer environment that allows a hard disk drive to write data to a tape drive unit. Each different subclass of the Data Transfer class provides a different data processing environment that defines how a specific data source may transfer data to a specific data target. The unmarked classes of FIG. 11 illustrate that many different subclasses could be defined to support a large number of data transfer environments.

FIG. 11 illustrates the relationships of the Data Transfer class to other classes in the framework. Data Transfer is an extensible class that contains the methods shown. Data Transfer is a class that a user of the framework will extend to define a specific data transfer environment that needs to be supported by the framework by subclassing the appropriate abstract classes (such as Place, Source Filter, etc.). Data Transfer has a "has by reference" relationship to the source Place class and the target Place class, indicating that a data transfer environment will include one or more objects from each of these classes. Data Transfer also has a "has by reference" relationship to the Source Filter class, the Transfer Condition class, and the Target Mapping class, indicating that a suitable data transfer environment implemented by appropriate subclassing of the framework may define zero, one or many of each of these classes. All of the relationships between classes in FIG. 11 are core relationships, that a user of the framework may not alter.

An object instantiated under the Data Transfer class will have the methods shown in FIG. 11. The DataTransfer() method and run() method simply call methods in the other extensible classes. The remaining methods (i.e., afterAll(); afterRead(); afterWrite(); beforeAll(); beforeRead(); beforeWrite()) are all private methods that may be initially implemented with no-ops, but may be overridden by subclassing from the Data Transfer class and by implementing these methods in the subclass. These methods are private (as marked by the two vertical lines), indicating that these methods are available only to the methods within the Data Transfer class, and cannot be invoked outside of Data Transfer. The specific sequence of these methods will be explained below in reference to the interaction diagrams of FIGS. 16 and 17.

Figure 12A:
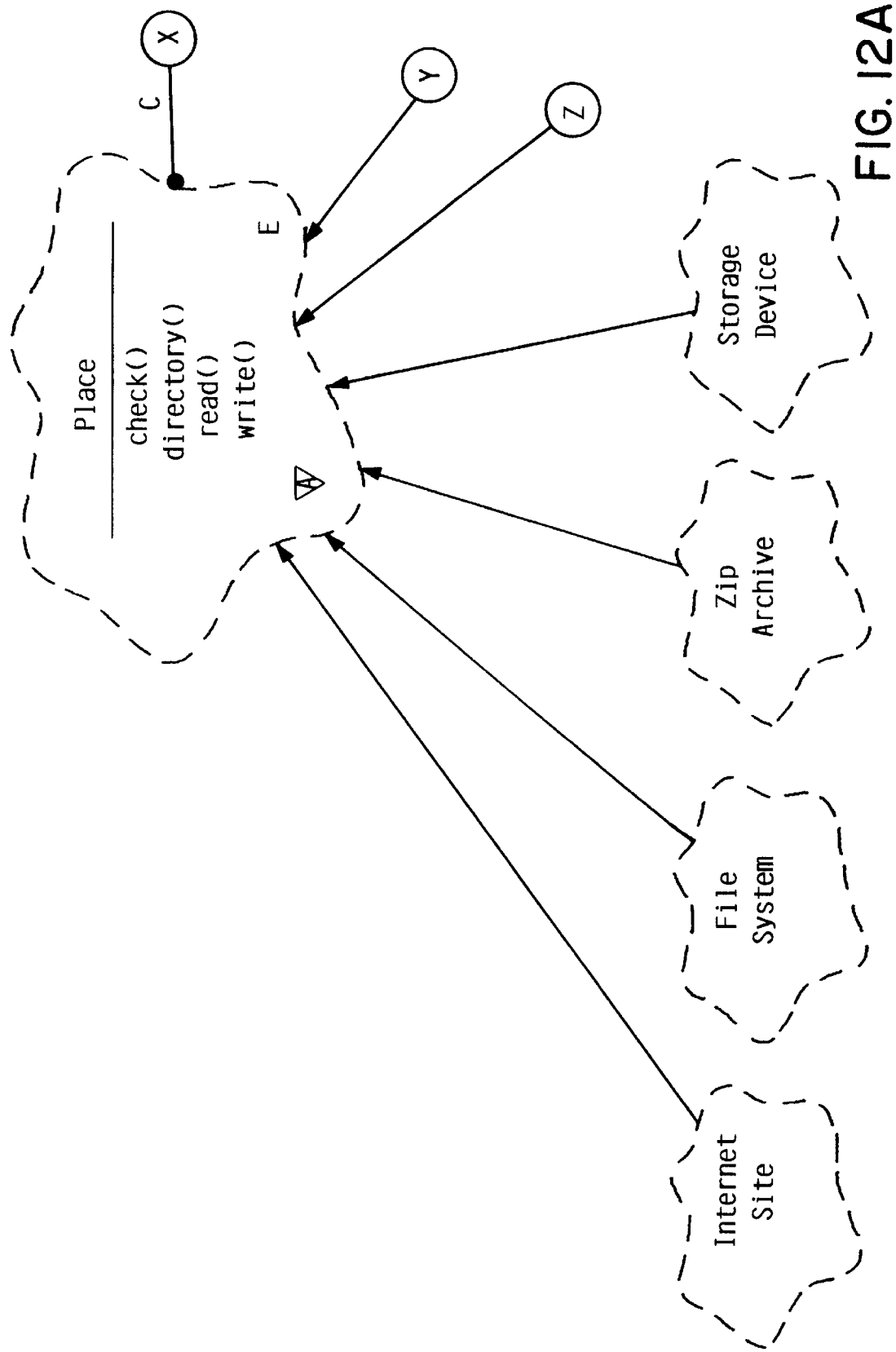
Figure 12B:
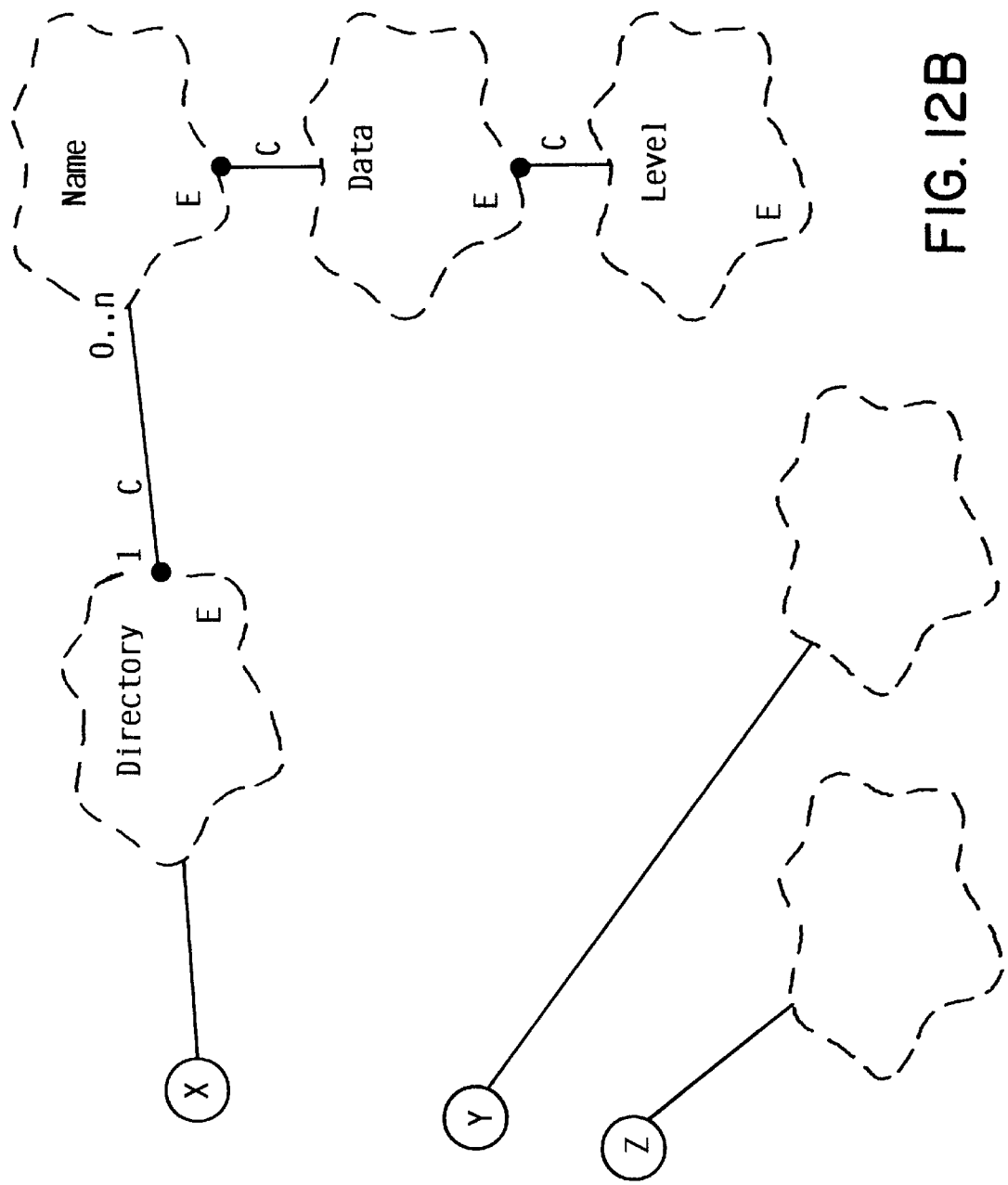

A class diagram of the classes in the Place category are shown in FIG. 12. The Place class is an extensible abstract class, and has a "has" relationship with the Directory class, which is an extensible class. The Directory class has a "has" relationship with the Name extensible class, with the 0. . . n indicating that each directory may have zero, one, or many Names. Each Name has associated Data, which has an associated Level. One example for Place is a hard disk drive, which contains a directory. The directory on a hard disk drive has zero to n files (i.e., Names); each file has its associated data (i.e., Data); and the data typically has an associated date stamp (i.e., Level). Note that the relationships between these classes are core relationships, those that may not be changed by the user of the framework.

As described with reference to FIG. 11, a user of the framework may extend the framework by subclassing from the extensible classes. Thus, for the Place class in FIG. 12, the following user-defined subclasses are provided as examples: Internet Site, File System, Zip Archive, and Storage Device. These user-defined Place subclasses may be defined as a data source, a data target, or both, in one or more data transfer environments. For the discussion herein, a source place serves as a data source, and a target place serves as a data target.

The extensible Place class in FIG. 12 defines a set of methods which provide the functions needed for the framework to operate. Each of these methods correspond to functions that may be performed during data transfer. These methods provide extensible interfaces that allow a user of the framework to take advantage of the flexibility and power of the framework by easily adapting the framework to new or different data transfer environments. The specific implementation shown in the figures for the classes are shown for the purpose of illustration, and a framework user may select alternative implementations by overriding extensible methods within the scope of the present invention.

The Place class has a check() method. A Name is passed as a parameter to the check() method, which causes the check() method to return the Level associated with the Data that corresponds to the Name passed. In this manner, the check() method is used to retrieve the Level corresponding to a particular Name. The directory() method returns the contents of the Directory class, which contains a list of all the Names stored in the Place. The read() method reads the data corresponding to a name passed to it, while the write() method writes a name and corresponding data to the Place.

Figure 13:
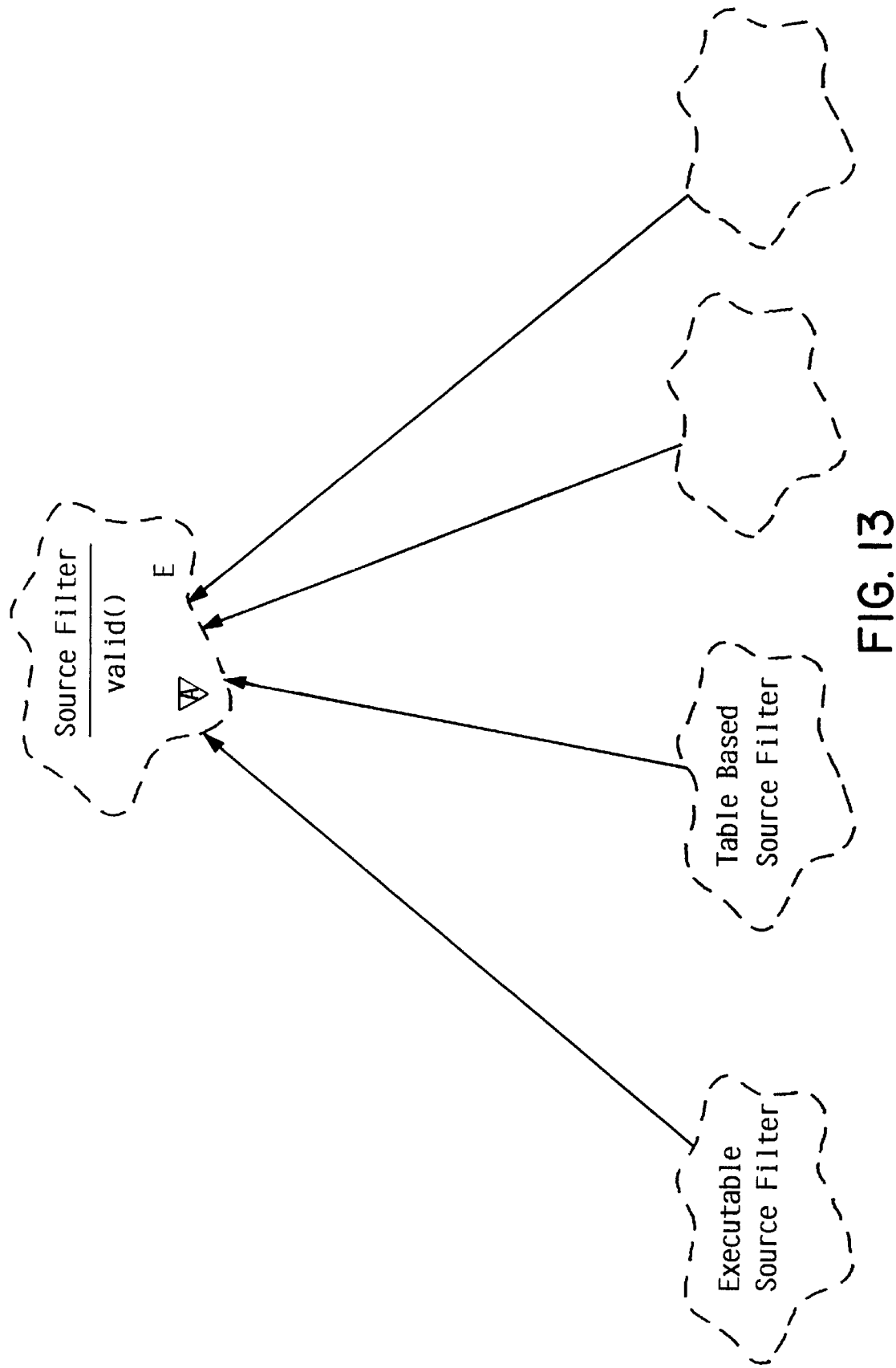

Referring to FIG. 13, a Source Filter class is an extensible abstract class of the framework. The Source Filter class has a single method valid(), which is passed a Name and its associated Data. Valid() is used to determine whether the Name and/or Data meet predetermined criteria for transfer. For example, if a framework user wants to transfer only executable files for a given data transfer environment, valid() may be programmed to return true if the file is an executable, and false otherwise. This might be the case for an Executable Source Filter, as shown in one of the possible subclasses for Source Filter. In another example, valid() might compare the name to a list of names in a name table that specifies transfer candidates, and return true of the data is listed in the table and return false otherwise. This could be the case for the Table Based Source Filter, another possible subclass for Source Filter. As illustrated by the empty subclasses of FIG. 13, other numerous possible subclasses for Source Filter may be implemented as well, and are shown as examples of additional user-extended classes that may be defined by subclassing from the Source Filter abstract class.

Figure 14:
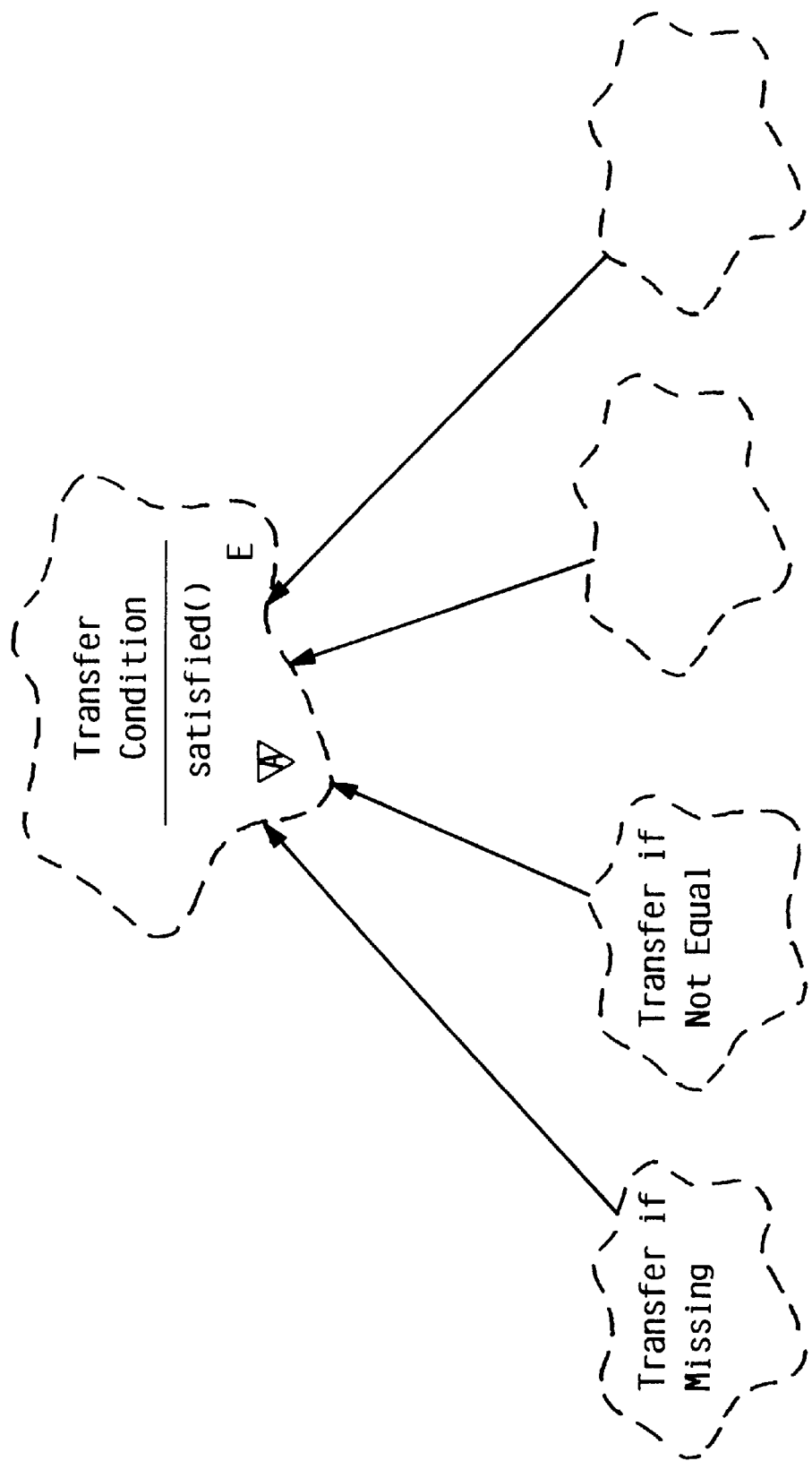

Referring to FIG. 14, a Transfer Condition class is an extensible abstract class of the framework. The Transfer condition class has a single method satisfied(), which compares the Level of the data source to the Level of the data target. Satisfied() is used to determine whether the Levels of data source and data target will allow the transfer. One specific example is illustrated by the Transfer If Missing subclass. For this specific example, if a framework user wants to transfer the data only if the data is missing from the data target, satisfied() may be programmed to return true if the file is missing on the data target, and false otherwise. In another example, illustrated by the Transfer If Not Equal subclass in FIG. 14, satisfied() might return true (i.e., allow the transfer) if the levels between the data source and the data target are not equal. As illustrated by the empty subclasses of FIG. 14, other numerous possible subclasses for Transfer Condition may be implemented as well, and are shown as examples of additional user-extended classes that may be defined by subclassing from the Transfer condition abstract class.

Figure 15:
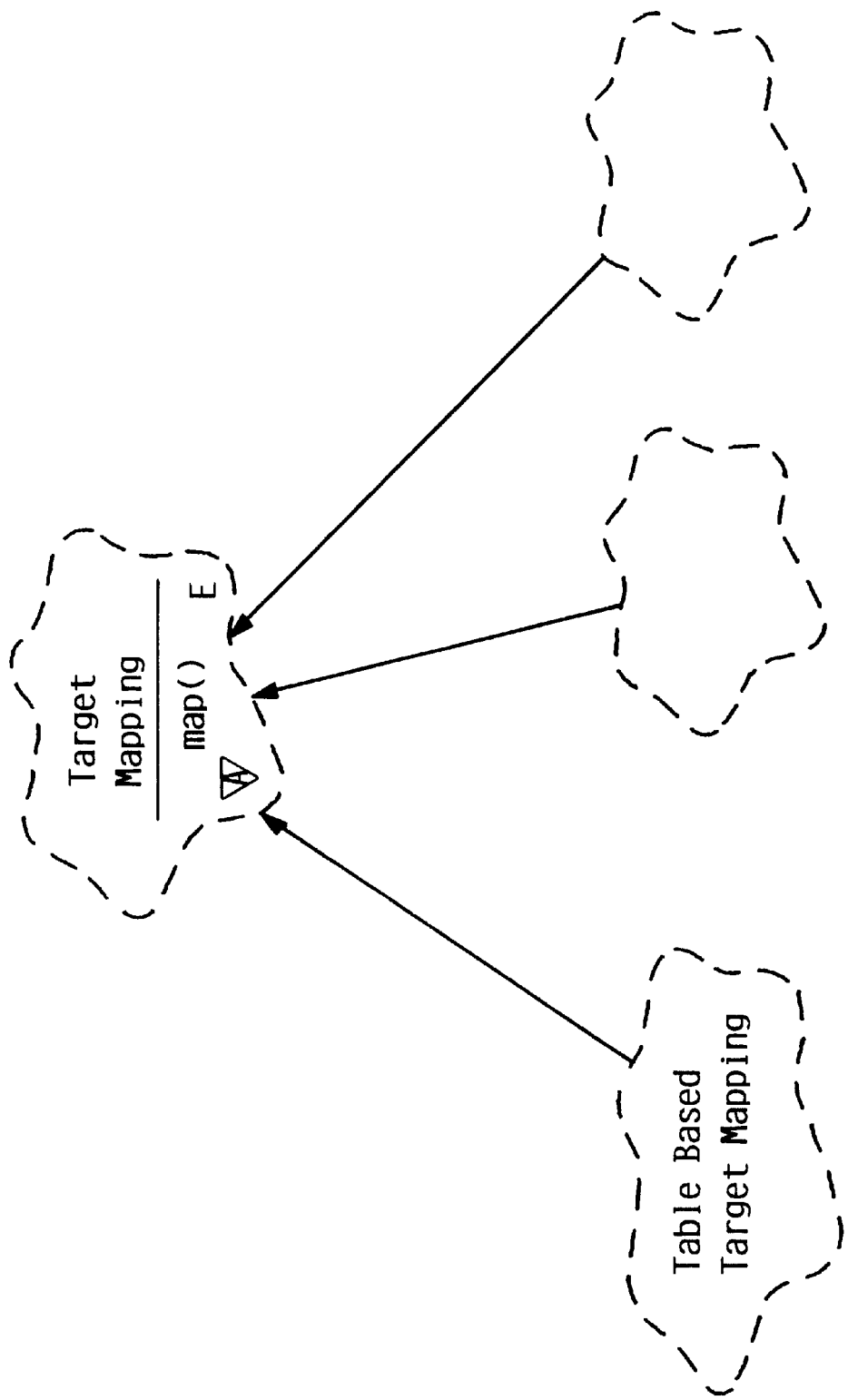

Referring to FIG. 15, a Target Mapping class is an extensible abstract class of the framework. The Target Mapping class has a single method map(), which is passed a Name and associated Data for the data source and the Name and associated Data for the data target. Map() is used to specify certain parameters for operating on the Name and/or Data during a transfer. For example, a file on one particular data source may need to be reformatted to comply with the file format for a different data target. One specific example, illustrated by the Table Based Target Mapping subclass in FIG. 15, would format a name from the data source to a different name on the data target. Another example would format data from the data source into table form, which is the form expected by the data target. As illustrated by the empty subclasses of FIG. 15, other numerous possible subclasses for Target Mapping may be implemented as well, and are shown as examples of user-extended classes that are defined by subclassing from the Target Mapping abstract class.

Core Functions

FIG. 11 best distinguishes between core and extensible functions in the data transfer framework of the present invention. Specifically, as noted above, all of the classes in this framework are extensible classes. All class relationships shown in FIG. 11 are core relationships, and may not be modified by the user of the framework. In fact, it is the fixed character of these relationships between classes that characterizes a framework and makes it useful and powerful. The core function of the data transfer framework is defined by the core class relationships, along with functional requirements that cause the framework to behave in the desired manner. As described above with respect to FIG. 9, the overall core function of the diagnostic framework includes the steps of method 900.

Object Interaction

Figure 16:
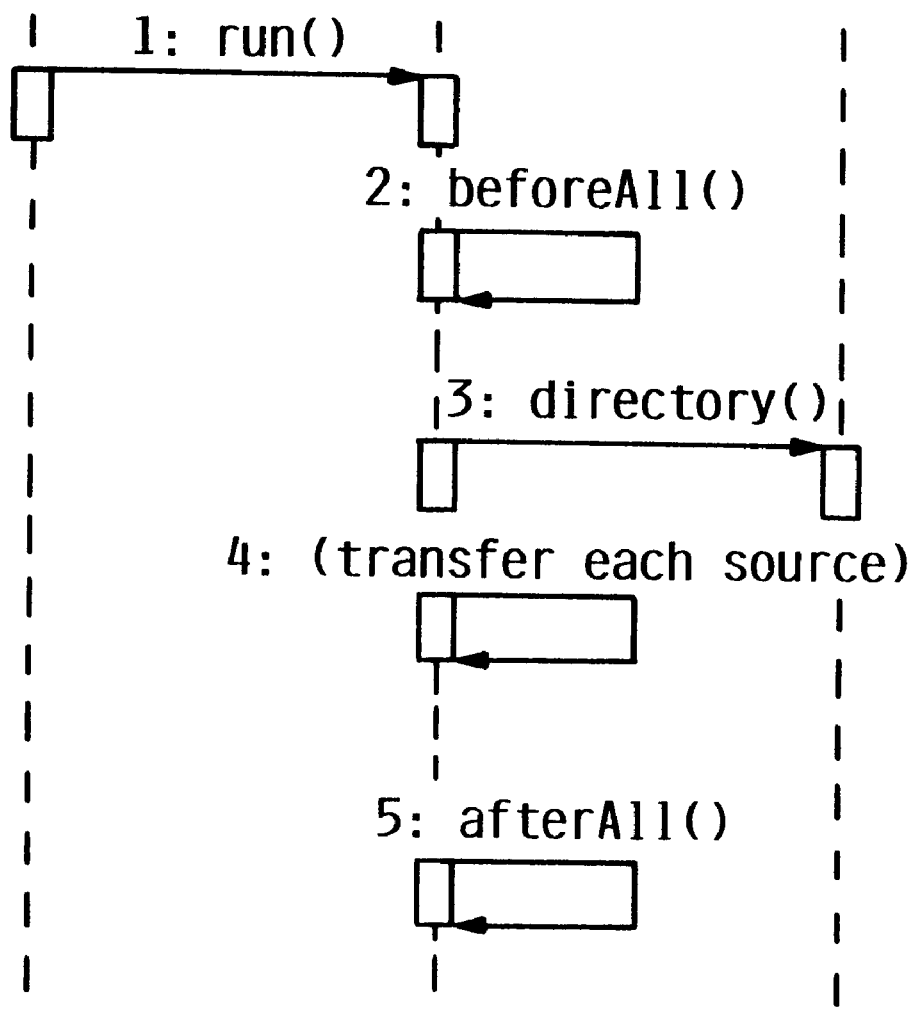
FIGS. 16 and 17 are interaction diagrams of the framework mechanism of FIGS. 11–15.
Figure 17:
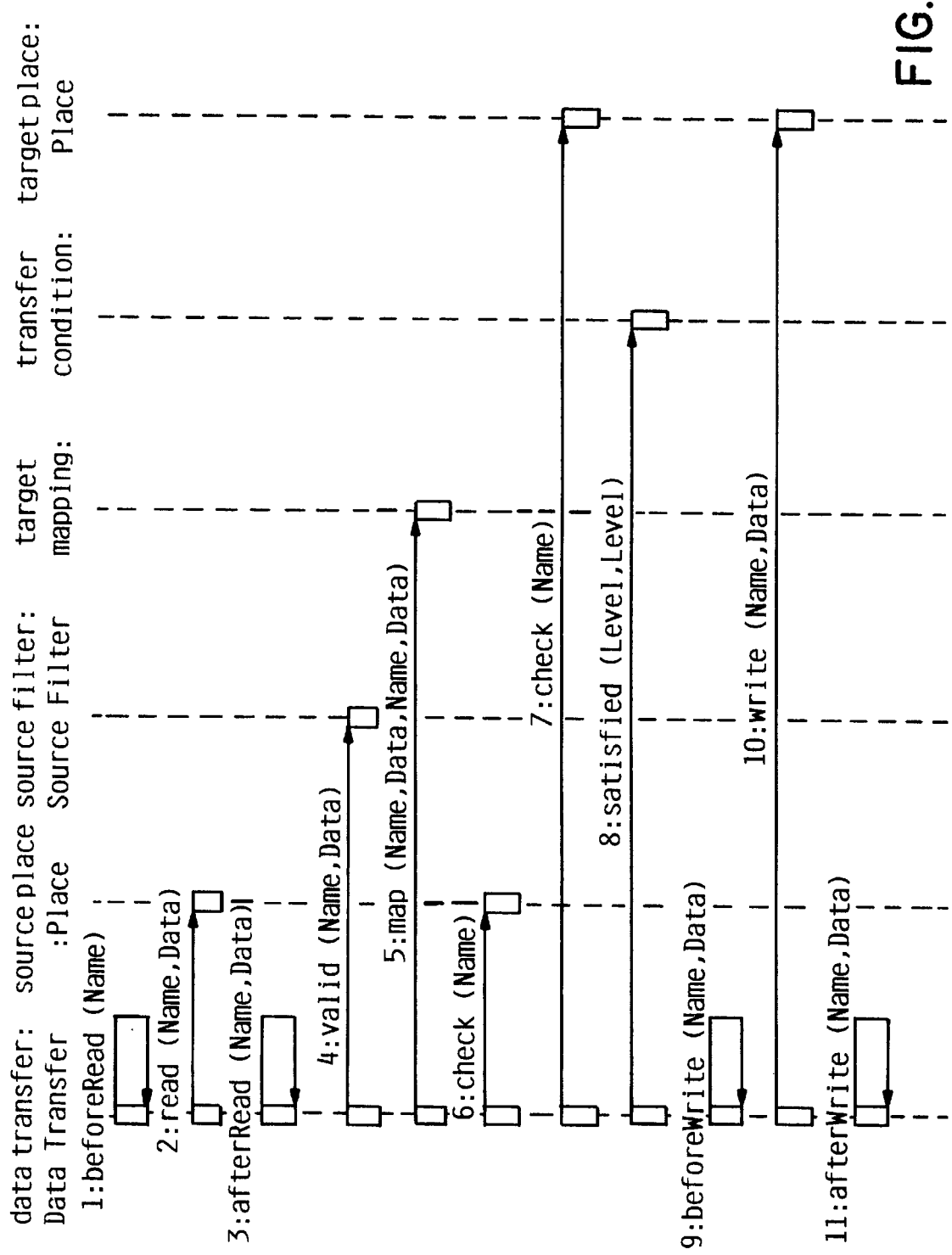

The operation of the framework of FIG. 11 may be best understood by the interaction diagrams of FIGS. 16 and 17. A main program first invokes the Data Transfer() method, which is a constructor method. The five parameters (i.e., data source place, data target place, source filter, transfer condition, and target mapping) are specified as parameters when the Data Transfer() method is invoked. The Data Transfer() method, as a constructor, builds the framework according to the parameters passed. The main program then invokes the run() method of the Data Transfer class just created, which causes the framework to perform its desired data transfer function. FIG. 16 shows the interaction diagram for the overall framework operation that is initiated when the run() method in the Data Transfer class is invoked (step 1). Data Transfer then invokes its own beforeAll() method (step 2). Once beforeAll() is complete, Data Transfer invokes the directory() method on the source place object (step 3). The directory() method returns the directory of data on the source place object, and corresponds to step 910 in method 900 of FIG. 9. Data Transfer then selects and processes each piece of data in the source place directory (step 4). The selection of data in step 4 corresponds to step 920 in FIG. 9. Once all data has been processed, the afterAll() method is invoked (step 5), and the Data Transfer function is complete.

The interaction diagram for the transfer of a single piece of data is shown in FIG. 17. First, the Data Transfer object invokes its own beforeRead() method (step 1). Next, Data Transfer invokes the read() method of the Source Place object to read the data corresponding to the Name passed to the read() method (step 2). This step 2 corresponds to step 930 of FIG. 9. Next, Data Transfer invokes its own afterRead() method. Next, it invokes the valid() method of the Source Filter object (step 4), which determines whether the Name and/or Data are valid for transfer. This step 4 corresponds to the Validate Data step 940 of FIG. 9. Data Transfer then invokes the map() method of the Target Mapping object (step 5), which performs any needed mapping of data during the transfer (step 950 of FIG. 9). Data Transfer then invokes the check() method of the Source Place object (step 6), which determines the Level corresponding to the Name on the Source Place object. In similar fashion, Data Transfer then invokes the check() method of the Target Place (step 7), which determines the Level corresponding to the Name on the Target Place object. Next the satisfied() method on the Transfer Condition object is invoked (step 8) to verify whether the data is to be transferred based on the Level of the Name at the Source Place object compared to the Level of the Name at the Target Place object (step 960 of FIG. 9). If the satisfied() method returns a true value, the beforeWrite() method is invoked (step 9). Next, Data Transfer invokes the write() method of the target place (step 10), to write the data to the data target (step 970 of FIG. 9). After the write, Data Transfer invokes its own afterWrite() method. At this point, Data Transfer continues processing if additional data remains to be processed (if step 980 of FIG. 9 is true).

As discussed above, the private methods of the Data Transfer class may be implemented with no-ops, or may provide some function that a framework extender may need. In either case, the private methods provided within the Data Transfer class may be overridden to provide any desired function at any time during the data transfer method. For example, if the framework user desires to perform a particular function before each portion of data is read, the user may implement the specific function by overriding the beforeRead() method. If the user desires to perform a particular function after each write, the afterWrite() method would be overridden. If the user desires a particular function after all data is transferred, the afterAll() method would be overridden. These private methods greatly expand the flexibility of the data processing framework by providing the capability of adding features to the framework at a later date by overriding the default methods without altering the basic structure or function of the framework.

Figure 18A:
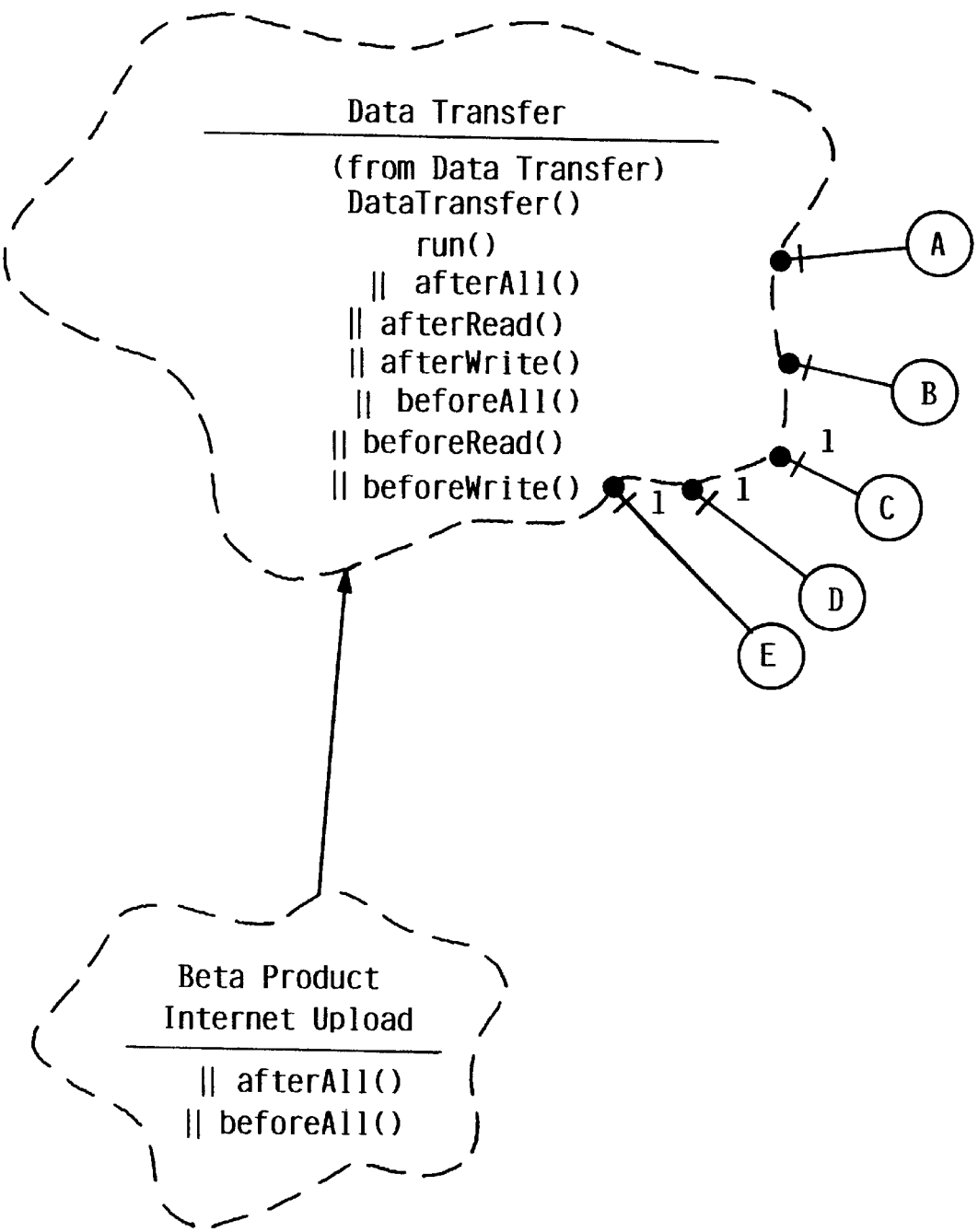
FIG. 18 is a class diagram showing the extension of the framework to implement a specific data transfer environment.
Figure 18B:
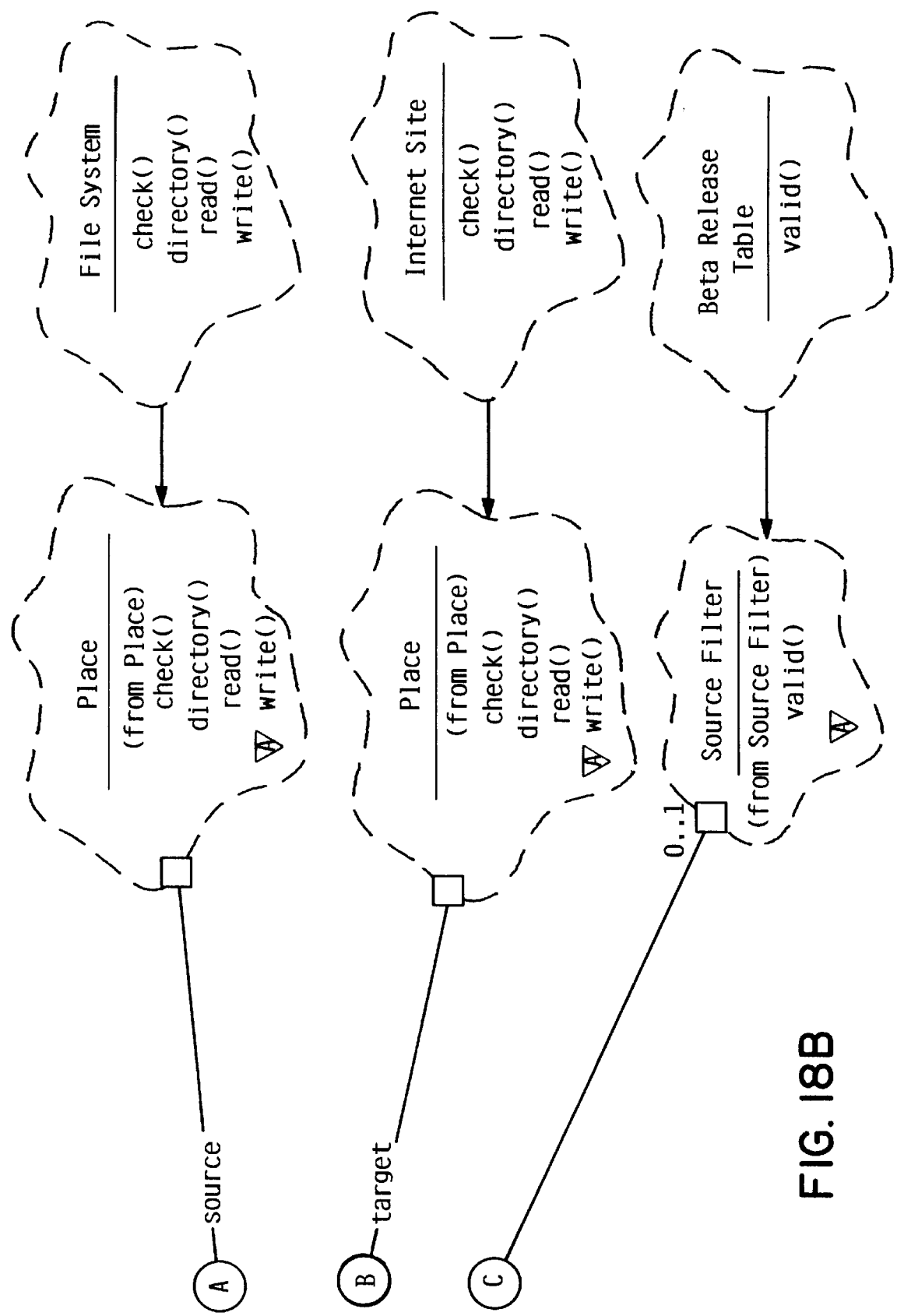
Figure 18C:
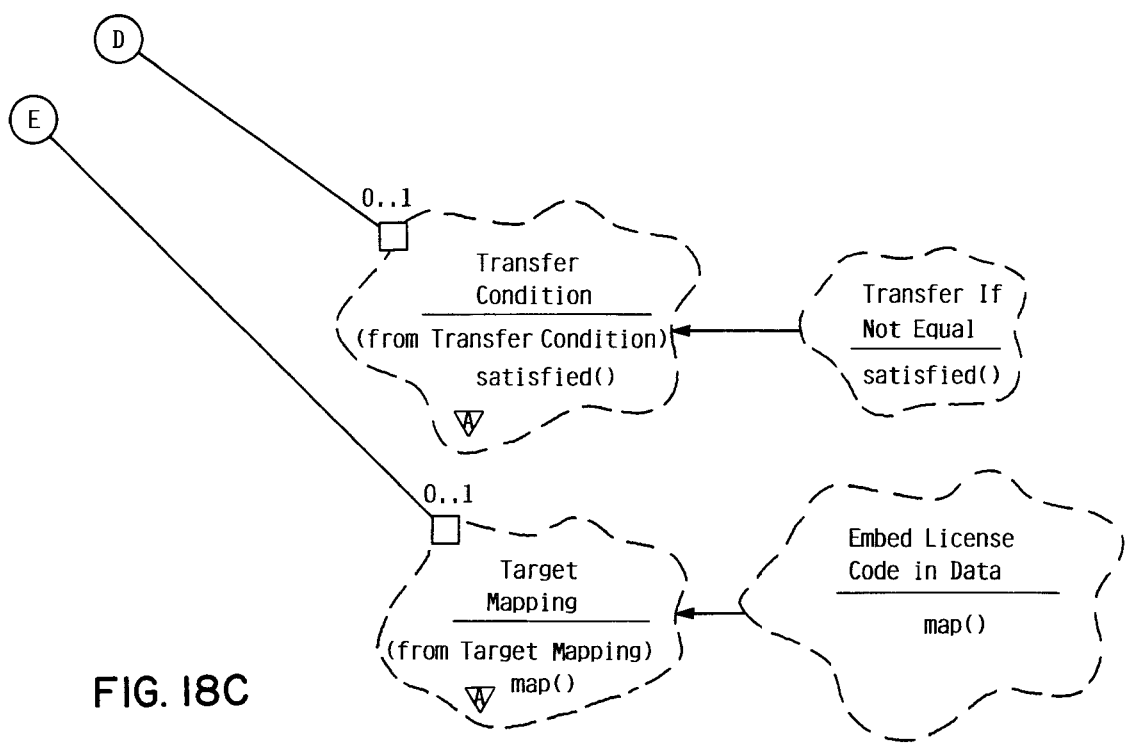

The detailed operation of framework 870 in accordance with the present invention will now be illustrated with reference to the specific data transfer environment shown in FIG. 18. A data transfer environment generally contains a specification of the following parameters: a source place; a target place; a source filter (if applicable) to select specific data on the data source to transfer; a transfer condition (if applicable) to set conditions that govern whether or not the data is transferred; and target mapping (if applicable) to manipulate the name and/or data during the transfer. The example illustrated in FIG. 18 is referred to herein as the Beta Product Internet Upload, which is specified as follows:
1) The source place is a File System
2) The target place is an Internet Site
3) Only the files in the Beta Release Table will be transferred
4) The files in the Beta Release Table will be transferred only if the most recent file does not exist at the Internet Site
5) License Code will be embedded in the data during the transfer The class diagram for the Beta Product Internet Upload example are shown in FIG. 18. Each of the classes shown either correspond to classes defined and discussed above, or are concrete subclasses of these classes. By defining a data transfer environment in this manner, the operation of the framework may be illustrated by referring to the interaction diagrams of FIGS. 16 and 17.

First, the run() method of the Data Transfer object is invoked (step 1, FIG. 16). Next, the beforeAll() method is invoked (step 2), followed by invoking the directory() method of the Source Place object (step 3). The directory() method will return a directory listing of the File System. One of the files in the directory is selected for transfer (step 4). At this point, we refer to FIG. 17 for the steps involved with transferring a single piece of data. The beforeRead() method is invoked (step 1), followed by the read() method (step 2), which reads the data from the selected file in File System. The afterRead() method is invoked next (step 3), followed by the valid() method in the Source Filter object (step 4). If the selected file is listed in the Beta Release Table, valid() returns true. Next, the map() method of the Target Mapping object is invoked (step 5), which embeds license code into the data being transferred. Next, the Level of the Source Name is checked (step 6), the level of the Target Name is checked (step 7), and the satisfied() method of the Transfer Condition object is invoked (step 8). For this particular example, the transfer takes place if the levels are not equal. Next, the beforeWrite() method is invoked (step 9), followed by the write() method of the Target Place object (step 10), which causes the file to be written to the Internet Site. The afterWrite() method is then invoked (step 11), which concludes the transfer for the selected piece of data. Once all data has been processed (i.e., once all files in File System that are in the Beta Release Table and that are not currently on the Internet Site are written to the Internet Site with License Code embedded), the afterAll() method is invoked (step 5 of FIG. 16), and the data transfer is complete.

As the example above illustrates, the framework provides an extremely flexible and powerful tool for implementing any number of data transfer environments by simply defining objects that implement the features specific to a particular data transfer environment.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications,* 2nd ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is more ally explained at Chapter 5, pp. 171–228 of the aforementioned book. The notational system used herein will be explained generally below. Other notational conventions used herein will be explained as needed.

A system that is modeled by an object-oriented framework can be represented at a high level of abstraction by a diagram called a top-level class diagram. FIG. 1 of the drawings is an example of a top-level class diagram containing boxes that represent abstractions of the modeled system. The boxes are arranged in a hierarchy such that boxes representing abstractions close to the physical components of the system are at the lower levels of the diagram and boxes representing more abstract, functional components are closer to the top of the diagram. In FIG. 1, the boxes are labeled as "mechanisms" to denote that the abstractions comprise means for implementing modeled system components. The boxes (mechanisms) can be thought of as categories comprising groups of similar classes defined according to object-oriented programming concepts. FIG. 1 represents a zoo administration model and therefore the lower hierarchy boxes include a box called Animal Mechanism, which represents animals within the zoo model, and a box called Containment Unit Mechanism, which represents animal pens and cages. At the highest level of FIG. 1, the box called Zoo Administration represents a functional abstraction that encompasses a variety of administrative tasks that are performed by personnel.

The boxes in a top-level class diagram represent the system abstractions that provide the system behavior. The system abstractions include classes and objects. Details of the system classes are provided in a class diagram that is used to show the class categories and to indicate the relationships and responsibilities of the classes. A class is represented by an irregularly shaped, dashed-line icon commonly referred to a cloud. FIG. 2, for example, shows several classes represented as clouds. Each class is identified by a name that is unique to the associated class category and also indicates the relationship of each class to one of the mechanisms illustrated in FIG. 1. Within a class icon, the class name is listed above attribute names, operation names followed by parentheses, and constraints that are enclosed within brackets. FIG. 3 illustrates the class Zoo Administrator in greater detail. FIG. 3 indicates that the Zoo Administrator class includes multiple operations, including ones called "5_minute_timer()", "add_animal()", and "add_containment_unit()". Words in the operation names (and class attribute names) are separated by an underscore for easier reading. An example of a class attribute listing is shown by the attributes called "feed_freq" and "temp_range" in the class Animals illustrated in FIG. 5.

Connecting lines between mechanisms (FIG. 1) and classes (FIG. 2) indicate the nature of the relationships between such respective abstractions. Thus, connections between the boxes in FIG. 1 represent relationships between the various mechanisms. A straight connecting line, for example, represents a simple association relationship indicating shared information. A "using" relationship is a refinement of a simple association whereby one abstraction that is referred to as a server or supplier provides services to another abstraction that is referred to as a client. Such a relationship is indicated by an open circle at one end of a simple association line, the open circle end designating the client that "uses" the associated server.

Another refinement of a simple association between two classes is a type referred to as an inheritance relationship. Inheritance is a relationship among classes in which one class shares the structure and/or behavior associated with one or more other classes. An inheritance association is also referred to as a "is a" relationship. Thus, given two classes A and B, the class A has an inheritance relationship with the class B if A is an example of a B; A is said to be a subclass of B and B is said to be a superclass or parent of A. That is, A "is a" B. An inheritance relationship is denoted with a connecting line that includes an arrowhead at one end to indicate a subclass that derives its characteristics from a parent class at the other end of the line.

Another refinement of class relationships is called an aggregation relationship, which denotes an association between a whole and its parts or attribute classes. In notation, an aggregation relationship is indicated between a whole class and an attribute class connected with an association line by a solid circle at the whole class end, with an attribute class at the other end.

Another relationship specified by a class diagram is an instantiation relationship. An instantiation relationship represents an instance of a class such as a particular implementation of a class as supported by a programming language. For example, a class called "animal" can have multiple instantiations comprising lions, tigers, and bears. An instantiation of a class is represented by a dashed association line with an arrowhead pointing from an instance of a class to the general class.

Finally, a class relationship referred to as a metaclass denotes a relationship in which a class itself is treated as an object that can be manipulated. That is, a metaclass is a class whose instances are themselves classes. Some computer languages, such as Small Talk, support the concept of a metaclass. Such relationships are denoted by a shaded line with an arrowhead pointing from an instance of a metaclass to the general metaclass.

Classes can be parameterized, which denotes a family of classes whose structure and behavior are defined independently of its formal class parameters. A parameterized class is represented by a cloud-shaped class icon with a rectangular box placed over a portion of the cloud. The parameter list is named within the rectangular box. An instantiated class includes a parameter box, called an adornment, in contrast to a dashed line box for a general class. The instantiation relationship between a parameterized class and its instantiated class is represented as a dashed line pointing to the parameterized class. Typically, an instantiated class requires a "using" relationship to another concrete class for use as an actual parameter.

Properties of classes can be represented by class adornments that are enclosed within the class cloud icon. In particular, an abstract class is denoted by an upper case block "A" within a triangle that is placed within a cloud. An abstract class is a class for which no instances may be created. That is, it is a class of classes. Other class adornments are functions of the OO implementation language. For example, the C++ language permits special class qualifications that will be given special adornments. A static class is represented by an upper case block "S" within an adornment triangle, a friend class is denoted by an upper case block "F" within an adornment triangle, and a virtual class is represented by an upper case block "V" within an adornment triangle.

In addition to defining classes, a designer of an object oriented programming system must define objects (see page 136 of Booch). Objects are represented as solid line clouds within which is placed the object name located above a list of object attributes. An object is a tangible entity that exhibits a well defined behavior. An object is intended to represent some part of a real system that is being represented by the object oriented program. An object is characterized by a state, a behavior, and an identity. An object can be thought of as an instance of a class. The behavior of an object is an indication of how the object acts and reacts in terms of its state changes and its message-passing actions.

Objects and their interrelationships are represented in object diagrams that comprise object icons having links that indicate synchronization between objects. Links are sequentially numbered to indicate the flow of operations. The existence of a link between two objects indicates an association between their corresponding classes and denotes a path of communication between them. Thus, a link between two objects indicates that one object may send messages to another. The direction of message transfer is indicated by adorning a simple connecting line with an arrowhead that points from an object that invokes an operation, referred to as the client, to the object that provides the operation, referred to as the supplier. Such a representation of a simple synchronization relationship denotes the simplest form of message-passing. Such an association can indicate, for example, the invocation of an operation. Operation parameters can be indicated adjacent the linking line.

Some objects may be active, meaning that they embody their own thread of control. That is, such objects are not simply sequential. Active objects may have a variety of concurrency characteristics. If an object has multiple threads of control, then synchronization must be specified. Message synchronization can be synchronous, meaning that the client will wait until the supplier accepts the message. Synchronous synchronization is indicated with an "X" with an arrowhead. Synchronization can encompass balking message-passing, meaning that the client will abandon the message if the supplier cannot immediately service the message. Balking is indicated with an arrowhead turned back on itself. Synchronization can encompass a time-out synchronization, meaning that the client will abandon the message if the supplier cannot service the message within a specified amount of time. Time-out synchronization is indicated with a clock face representation adjacent a linking arrowhead. Finally, synchronization can encompass an asynchronous message, meaning that the client sends an event to a supplier for processing, the supplier queues the message, and the client then proceeds without waiting for the supplier. Those skilled in the art will appreciate that asynchronous message synchronization is analogous to interrupt handling. Asynchronous message synchronization is indicated with a half arrowhead.

It bears mention that the Booch notation includes interaction diagrams that trace the execution of objects and classes. Interaction diagrams are essentially restructured object diagrams. That is, interaction diagrams convey the same information from that conveyed by object diagrams, but simply present the same information in a different format. The present specification makes use of both object diagrams (for the ZAF example) and interaction diagrams (for the description of the invention), and those skilled in the art will recognize that they are equivalent and also will understand how to convert from one to the other without further explanation.

In FIG. 7, for example, the object called Zelda 706 obtains a list of current zoo keepers by calling an operation called List Zoo Keepers from the object called Zoo Keeper Register. The second processing step is represented in FIG. 7 by the Zoo Keeper Register object responding to the operation call by passing a message to the Zelda object that comprises the zoo keeper list. The zoo keeper objects include members of the Zoo Keepers class called Tina, Vince, and Fred. The third step indicated in the object diagram is for the object Zelda to pass a message to each of the zoo keepers instructing them to check the animals by calling the respective Check Animals operation of each zoo keeper object.

We claim:

1. A computer system, the computer system transferring data from a data source to a data target, the computer system comprising:

a central processing unit, and a main memory coupled to the central processing unit, the main memory containing an object-oriented framework mechanism that provides a user-extensible data transfer mechanism that transfers data from the data source to the data target, the framework mechanism executing on the central processing unit, the framework mechanism including:

a user-extensible place class, the place class defining:
   at least one place object corresponding to the data source;
   at least one place object corresponding to the data target; and
   a first set of object methods to transfer the data from the data source to the data target;

a user-extensible source filter class, the source filter class determining the data to be transferred from the data source to the data target;

a user-extensible transfer condition class, the transfer condition class determining at least one condition that must be satisfied for the data to be transferred from the data source to the data target; and a user-extensible target mapping class, the target mapping class determining at least one change to make to the data being read from the data source before writing the changed data to the data target.

2. The computer system of claim 1 wherein the framework mechanism further comprises a data transfer class that has a "has a" relationship with the at least one place object corresponding to the data source and that has a "has a" relationship with the at least one place object corresponding to the data target, the data transfer class comprising an extensible class of the framework mechanism, the data transfer class defining a second set of object methods to transfer the data from the data source to the data target.

3. The computer system of claim 1 wherein the framework mechanism comprises:

at least one place object corresponding to the data source;
   at least one place object corresponding to the data target;
   the first set of object methods including at least one method for reading the data from the data source and at least one method for writing the data to the data target;
   at least one data transfer object that defines at least one user-defined data transfer environment, the data transfer object including a second set of object methods to transfer the data from the data source to the data target;

at least one source filter object including a third set of object methods that determine the data to be transferred from the data source to the data target;

at least one transfer condition object including a fourth set of object methods that determine at least one condition that must be satisfied for data to be transferred from the data source to the data target; and at least one target mapping object including a fifth set of object methods that determine at least one change to make to the data being read from the data source before writing the changed data to the data target.

4. A method for transferring data from a data source to a data target, the method comprising the steps of:

providing a user-extensible object oriented framework mechanism that performs the transfer of the data according to extended portions of the framework mechanism that are customized by a user to provide a desired data transfer environment;

executing the object oriented framework mechanism on a computer system;

extending the framework mechanism to define the desired data transfer environment;

selecting at least one data source;

selecting at least one data target;

implementing the desired data transfer environment by defining the extended portions in accordance with the selected at least one data source and the selected at least one data target;

selecting at least one source filter that defines the data to be transferred from the data source to the data target;

selecting at least one transfer condition that must be satisfied for the data to be transferred from the data source to the data target;

the step of implementing the desired data transfer environment including the step of defining the extended portions in accordance with the selected at least one source filter and the at least one transfer condition.

5. The method of claim 4 further including the steps of:

selecting at least one target mapping criterion for changing the data read from the data source before writing the changed data to the data target;

the step of implementing the desired data transfer environment further including the step of defining the extended portions in accordance with the selected at least one target mapping criterion.

6. The method of claim 4 further including the steps of:

reading from the data source a list of available data to transfer;

the at least one source filter filtering the list of available data and producing therefrom a list of valid data to be transferred;

determining which of the list of available data satisfy the selected at least one transfer condition; and transferring the data that:
   (1) satisfies the at least one transfer condition; and
   (2) is on the list of valid data.

7. The method of claim 4 wherein the step of selecting at least one source filter that defines the data to be transferred from the data source to the data target includes the step of defining data that match a predetermined selection criterion.

8. The method of claim 4 wherein the step of selecting at least one transfer condition that must be satisfied for the data to be transferred from the data source to the data target includes the steps of:

comparing an identifier for the data on the data source with a plurality of identifiers on the data target;

if matching identifiers are found, determining the date of creation for the data on the data source and for the data on the data target;

if the date of creation for the data on the data source is more recent than the date of creation for the corresponding data on the data target, including the data on the data source in the data to be transferred to the data target;

if the date of creation for the data on the data source is less recent than the date of creation for the corresponding data on the data target, not including the data on the data source in the data to be transferred to the data target.

9. A program product comprising:
(A) an object-oriented framework mechanism for transferring data, the framework mechanism including a user-extensible data transfer mechanism that transfers data from a date source to a data target according to extended portions of the framework mechanism, the framework mechanism comprising:
  a user-extensible place class, the place class defining:
    at least one place object corresponding to the data source;
    at least one place object corresponding to the data target; and
    a first set of object methods to transfer the data from the data source to the data target;
  a user-extensible source filter class, the source filter class determining the data to be transferred from the data source to the data target;
  a user-extensible transfer condition class, the transfer condition class determining at least one condition that must be satisfied for the data to be transferred from the data source to the data target; and
  a user-extensible target mapping class, the target mapping class determining at least one change to make to the data being read from the data source before writing the changed data to the data target; and
(B) signal bearing media bearing the framework mechanism.

10. The program product of claim 9 wherein the signal bearing media comprises recordable media.

11. The program product of claim 9 wherein the signal bearing media comprises transmission media.

12. A user-extensible object oriented framework mechanism for use in a computer system that supports an object oriented programming environment, the framework mechanism comprising:
  at least one place object corresponding to the data source;
  at least one place object corresponding to the data target;
  a first set of object methods including at least one method for reading the data from the data source and at least one method for writing the data to the data target;
  at least one data transfer object that defines at least one user-defined data transfer environment, the data transfer object including a second set of object methods to transfer the data from the data source to the data target;
  at least one source filter object including a third set of object methods that determine the data to be transferred from the data source to the data target;
  at least one transfer condition object including a fourth set of object methods that determine at least one condition that must be satisfied for data to be transferred from the data source to the data target; and
  at least one target mapping object including a fifth set of object methods that determine at least one change to make to the data being read from the data source before writing the changed data to the data target.

13. The object created framework mechanism of claim 12 wherein the at least one data transfer object invokes at least one method from at least one of the first, third, fourth and fifth sets of object methods.

14. The object oriented framework mechanism of claim 12 wherein the framework mechanism comprises:
  at least one core function defined by relationships between a plurality of classes within the framework mechanism, wherein the implementation of the at least one core function is defined by the framework mechanism and cannot be modified by a user of the framework mechanism; and
  at least one extensible function defined by at least one extensible class, wherein the implementation of the at least one extensible function is defined by the user of the framework mechanism by extending the at least one extensible class.

15. A method for performing data transfer from a data source to a data target, the method comprising the steps of:
(A) providing at least one place object corresponding to at least one data source, the place object including a first set of object methods that read the data from the data source;
(B) providing at least one place object corresponding to at least one data target, the place object including the first set of object methods that write the data to the data target;
(C) providing at least one data transfer object that defines at least one user-defined data transfer environment, the data transfer object including a second set of object methods to transfer the data from the data source to the data target;
(D) providing at least one source filter object including a third set of object methods that determine the data to be transferred from the data source to the data target;
(E) providing at least one transfer condition object including a fourth set of object methods that determine at least one condition that must be satisfied for data to be transferred from the data source to the data target;
(F) providing at least one target mapping object including a fifth set of object methods that determine at least one change to make to the data being read from the data source before writing the changed data to the data target;
(G) providing an object oriented framework mechanism that comprises the at least one object corresponding to the data source, the at least one object corresponding to the data target, the at least one data transfer object, the at least one source filter object, the at least one transfer condition object, and the at least one target mapping object, and wherein the object oriented framework mechanism performs the data transfer from the data source to the data target according to extended portions of the framework mechanism that are customized by a user to provide the data transfer environment; and
(H) executing the object oriented framework mechanism on a computer system to transfer the data from the data source to the data target.

16. The method of claim 15 further including the step of:
extending the framework mechanism to define the data transfer environment.

17. The method of claim 16 further including the steps of:
selecting at least one data source;
selecting at least one data target;
implementing the desired data transfer environment by defining the extended portions in accordance with the selected at least one data source and the selected at least one data target.

18. The method of claim 17 further including the steps of:
selecting at least one source filter that defines the data to be transferred from the data source to the data target;
selecting at least one transfer condition that must be satisfied for the data to be transferred from the data source to the data target;
the step of implementing the desired data transfer environment including the step of defining the extended portions in accordance with the selected at least one source filter and the at least one transfer condition.

19. The method of claim 18 further including the steps of:
selecting at least one target mapping criterion for changing the data read from the data source before writing the data to the data target;
the step of implementing the desired data transfer environment further including the step of defining the extended portions in accordance with the selected at least one target mapping criterion.

20. The method of claim 18 further including the steps of:
reading from the data source a list of available data to transfer;
the at least one source filter filtering the list of available data and producing therefrom a list of valid data to be transferred;
determining which of the list of available data satisfy the selected at least one transfer condition; and
transferring the data that:
(1) satisfies the at least one transfer condition; and
(2) is on the list of valid data.

21. A program product comprising:
(A) an object oriented framework mechanism for transferring data from a data source to a data target, the object oriented framework mechanism including at least one place object corresponding to the data source including a first set of object methods to read the data from the data source, the object oriented framework mechanism further including at least one place object corresponding to the data target including the first set of object methods to write the data to the data target, the object oriented framework mechanism further including at least one data transfer object including a second set of object methods that define at least one user-defined data transfer environment, the object oriented framework mechanism further including at least one source filter object including a third set of object methods that determine the data to be transferred from the data source to the data target, the object oriented framework mechanism further including at least one transfer condition object including a fourth set of object methods that determine at least one condition that must be satisfied for data to be transferred from the data source to the data target, the object oriented framework mechanism further including at least one target mapping object including a fifth set of object methods that determine at least one change to make to the data being read from the data source before writing the changed data to the data target, wherein the object oriented framework mechanism transfers the data from the data source to the data target according to extended portions of the framework mechanism that are customized by a user to provide the desired data transfer environment; and (B) signal bearing media bearing the object oriented framework mechanism.

22. The program product of claim 21 wherein the signal bearing media comprises recordable media.

23. The program product of claim 21 wherein the signal bearing media comprises transmission media.

24. The program product of claim 21 wherein the framework mechanism comprises a place class, a data transfer class, a source filter class, a transfer condition class, and a target mapping class, and wherein the data transfer class has a "has a" relationship with each of the place class, the source filter class, the transfer condition class, and the target mapping class.

25. The program product of claim 24 wherein the place class, the source filter class, the transfer condition class, and the target mapping class are extensible classes of the framework mechanism, the implementation of which by a user defines the at least one data transfer environment.

26. An object oriented framework mechanism that transfers data from a data source to a data target, the framework mechanism comprising:
at least one core function defined by relationships between a plurality of classes within the framework mechanism, wherein the implementation of the at least one core function is defined by the framework mechanism and cannot be modified by a user of the framework mechanism;
at least one extensible class wherein the implementation of the at least one extensible class is defined by the user of the framework mechanism, by extending the at least one extensible class, thereby defining at least one user-defined data transfer environment;
at least one place object corresponding to the data source;
at least one place object corresponding to the data target;
a first set of object methods including at least one method for reading the data from the data source and at least one method for writing the data to the data target;
at least one data transfer object that defines at least one user-defined data transfer environment, the data transfer object including a second set of object methods to transfer the data from the data source to the data target;
at least one source filter object including a third set of object methods that determine the data to be transferred from the data source to the data target;
at least one transfer condition object including a fourth set of object methods that determine at least one condition that must be satisfied for data to be transferred from the data source to the data target; and
at least one target mapping object including a fifth set of object methods that determine at least one change to make to the data being read from the data source before writing the changed data to the data target.

27. The object oriented framework mechanism of claim 26 wherein the framework mechanism comprises a place class, a data transfer class, a source filter class, a transfer condition class, and a target mapping class, and wherein the data transfer class has a "has a" relationship with each of the place class, the source filter class, the transfer condition class, and the target mapping class.

28. A method for transferring data from a data source to a data target using a computer system having a central processing unit and a main memory, the main memory having an application program that provides an object oriented programming environment, the method comprising the steps of:

(A) providing in the program an object oriented framework mechanism that performs the data transfer according to extended portions of the framework mechanism that are customized by a user to provide a desired data transfer environment, the framework mechanism including:
- a set of core functions wherein the implementation of the core functions is defined by the framework mechanism and cannot be modified by a user of the framework mechanism; and
- a set of extensible functions wherein the implementation of the extensible functions is defined by the user of the framework mechanism;

(B) extending the extensible functions in the framework mechanism to define particular classes having predetermined protocols and defining particular object methods that perform the data transfer, the extensible functions defining the desired data transfer environment;

(C) generating an executable data transfer system by integrating together the extensible functions and the core functions; and (D) executing the executable data transfer system on the computer system to perform the data transfer from the data source to the data target.

29. The method of claim 28 further including the steps of:

identifying available data on the data source;

selecting from the available data a set of filtered data using at least one of a first set of selection criterion;

selecting from the set of filtered data a set of valid data using at least one of a second set of selection criterion;

reading the valid data from the data source; and writing the valid data to the data target.

30. A program product comprising:

(A) a user-extensible object oriented framework mechanism for transferring data from a data source to a data target, the framework mechanism including at least one core function defined by relationships between a plurality of classes within the framework mechanism, wherein the implementation of the at least one core function is defined by the framework mechanism and cannot be modified by a user of the framework mechanism, the framework mechanism further including at least one extensible function defined by at least one extensible class, wherein the implementation of the at least one extensible class is defined by the user of the framework mechanism by extending the at least one extensible class, thereby defining a user-defined data transfer environment that governs the operation of the framework mechanism, the framework mechanism comprising:

at least one place object corresponding to the data source;

at least one place object corresponding to the data target;

a first set of object methods including at least one method for reading the data from the data source and at least one method for writing the data to the data target;

at least one data transfer object that defines at least one user-defined data transfer environment, the data transfer object including a second set of object methods to transfer the data from the data source to the data target;

at least one source filter object including a third set of object methods that determine the data to be transferred from the data source to the data target;

at least one transfer condition object including a fourth set of object methods that determine at least one condition that must be satisfied for data to be transferred from the data source to the data target; and at least one target mapping object including a fifth set of object methods that determine at least one change to make to the data being read from the data source before writing the changed data to the data target;

wherein the object oriented framework mechanism performs the data transfer from the data source to the data target according to extended portions of the framework mechanism that are customized by a user to provide a desired data transfer environment; and (B) signal bearing media bearing the object oriented framework mechanism.

31. The program product of claim 30 wherein the signal bearing media comprises recordable media.

32. The program product of claim 30 wherein the signal bearing media comprises transmission media.

* * * * *